(12) United States Patent
Kim et al.

(10) Patent No.: US 12,449,839 B2
(45) Date of Patent: Oct. 21, 2025

(54) DISPLAY DEVICE

(71) Applicant: Samsung Display Co., LTD., Yongin-si (KR)

(72) Inventors: Tae Chang Kim, Yongin-si (KR); Hae Jin Kim, Yongin-si (KR); Tae Hoon Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 204 days.

(21) Appl. No.: 18/318,825

(22) Filed: May 17, 2023

(65) Prior Publication Data

US 2024/0094769 A1    Mar. 21, 2024

(30) Foreign Application Priority Data

Sep. 15, 2022    (KR) .................. 10-2022-0116510

(51) Int. Cl.
*G06F 1/16*    (2006.01)

(52) U.S. Cl.
CPC .................................. *G06F 1/1624* (2013.01)

(58) Field of Classification Search
None
See application file for complete search history.

(56) References Cited

U.S. PATENT DOCUMENTS 11,497,130 B2 *   11/2022   Song ................ G06F 1/1624
2021/0385311 A1*  12/2021   Kim ................. G06F 1/1677
2021/0409532 A1*  12/2021   Lee ................. H04M 1/0268
2022/0039273 A1*   2/2022   Zhang .............. H04M 1/0237
2023/0010760 A1*   1/2023   Lee ................. G06F 1/1658

FOREIGN PATENT DOCUMENTS

| KR | 10-2016-0031363 |   | 3/2016 |           |
|----|------------------|---|--------|-----------|
| KR | 10-2017-0123854 |   | 11/2017 |           |
| KR | 10-2021-0083442 |   | 7/2021 |           |
| KR | 10-2021-0118850 |   | 10/2021 |           |
| KR | 10-2022-0008732 |   | 1/2022 |           |
| KR | 20220008732 A | * | 1/2022 | G06F 1/1652 |

OTHER PUBLICATIONS

Shin et. al (KR 20220008732 A) (Year: 2022).*

* cited by examiner

*Primary Examiner* — Allen L Parker
*Assistant Examiner* — Elisa Sasserath
(74) *Attorney, Agent, or Firm* — Sughrue Mion, PLLC

(57) ABSTRACT

A display device includes a display panel including a first active area and a second active area slidable in a first direction, a plurality of segments spaced apart from one another in the first direction, extending in a second direction intersecting the first direction, and supporting a lower surface of the second active area, a panel housing having a guide rail engaged with a portion of each of the segments to guide a sliding motion of the display panel, and a first roller extending in the second direction, disposed in the panel housing, and surrounded by the lower surface of the second active area. The first roller includes a central portion having a first diameter, and a stepped portion protruding from the central portion in the second direction, forming a level difference with the central portion, and overlapping at least one of the segments to form a space.

15 Claims, 22 Drawing Sheets

110 : 110a, 110b, 110c

DM : PNL, SM
SM : SG, SP_2

DISPLAY DEVICE

CROSS REFERENCE TO RELATED APPLICATION(S)

This application claims priority to and benefits of Korean Patent Application No. 10-2022-0116510 under 35 U.S.C. § 119, filed on Sep. 15, 2022, in the Korean Intellectual Property Office (KIPO), the entire contents of which are incorporated herein by reference.

BACKGROUND

1. Technical Field

The disclosure relates to a display device.

2. Description of the Related Art

Display devices become more and more important as multimedia technology evolves. Accordingly, a variety of types of display devices such as organic light-emitting display (OLED) devices and liquid-crystal display (LCD) devices are currently used.

Display devices include a display panel such as an organic light-emitting display panel and a liquid-crystal display panel for displaying images. Among them, light-emitting display panel may include light-emitting elements. For example, light-emitting diodes (LEDs) may include an organic light-emitting diode (OLED) using an organic material as a fluorescent material, and an inorganic light-emitting diode using an inorganic material as a fluorescent material.

Recently, as the display technology evolves, research and development on a display device having a flexible display are ongoing. The display screen of a flexible display can be extended or reduced by folding, bending, or sliding the display screen, thereby contributing greatly to the reduction of the volume or the design change of the display device.

SUMMARY

Aspects of the disclosure provide a display device that can reduce the interference between a display panel and a set cover.

It should be noted that objects of the disclosure are not limited to the above-mentioned object; and other objects of the disclosure will be apparent to those skilled in the art from the following descriptions.

According to an embodiment of the disclosure, it is possible to reduce interference between a display panel and a set cover.

According to an embodiment of the disclosure, a display device may include a display panel including a first active area and a second active area disposed on a side of the first active area and slidable in a first direction, a plurality of segments spaced apart from one another in the first direction, extending in a second direction intersecting the first direction, and supporting a lower surface of the second active area of the display panel, a panel housing having a guide rail engaged with a portion of each of the plurality of segments to guide a sliding motion of the display panel, and a first roller extending in the second direction, disposed in the panel housing, and surrounded by the lower surface of the second active area of the display panel. The first roller may include a central portion having a first diameter, and a stepped portion protruding from the central portion in the second direction, forming a level difference with the central portion, and overlapping at least one of the plurality of segments to form a space in a thickness direction of the second active area.

According to an embodiment of the disclosure, each of the plurality of segments may include a support area overlapping the second active area of the display panel in the thickness direction, and a protruding area that does not overlap the display panel in the thickness direction and engages with the guide rail. The central portion of the first roller may overlap the support area of the at least one of the plurality of segments in the thickness direction, and the stepped portion of the first roller may overlap the protruding area of the at least one of the plurality of segments in the thickness direction.

According to an embodiment of the disclosure, the stepped portion may have a second diameter less than the first diameter.

According to an embodiment of the disclosure, the first roller may further include a protrusion that protrudes from the stepped portion in the second direction and engages with a hole formed on the panel housing, and the protrusion may have a third diameter less than the second diameter.

According to an embodiment of the disclosure, the protrusion of the first roller may not overlap the plurality of segments in the thickness direction.

According to an embodiment of the disclosure, a portion of the second active area may be curved along the first roller to surround the first roller, the plurality of segments may include a first segment disposed in the portion of the second active area, and the first segment may be convexly curved in a radial direction of the first roller.

According to an embodiment of the disclosure, an end of the first segment that is convexly curved may be disposed adjacent to the stepped portion of the first roller.

According to an embodiment of the disclosure, a diameter of the stepped portion may gradually decrease from the central portion in an axial direction.

According to an embodiment of the disclosure, the central portion may include a first portion and a second portion, the first portion and the second portion having the first diameter and spaced apart from each other in the second direction, and a third portion having a second diameter less than the first diameter and disposed between the first portion and the second portion.

According to an embodiment of the disclosure, the display panel may further include a third active area disposed on an opposite side of the first active area and slidable in the first direction, and the plurality of segments may support the lower surface of the second active area and a lower surface of the third active area. The display device may further include a second roller extending in the second direction, disposed in the panel housing, and surrounded by the lower surface of the third active area of the display panel.

According to an embodiment of the disclosure, the second roller may include a central portion having the first diameter, and a stepped portion protruding from the central portion in the second direction, forming a level difference with the central portion, and overlapping at least another one of the plurality of segments to form a space in the thickness direction.

According to an embodiment of the disclosure, the display panel may further include a subsidiary area protruding from the first active area in the second direction, and a driving chip for driving the display panel may be mounted on the subsidiary area.

According to an embodiment of the disclosure, a display device may include a display panel including a first active area and a second active area disposed on a side of the first active area and slidable in a first direction, a plurality of segments spaced apart from one another in the first direction, extending in a second direction intersecting the first direction, and supporting a lower surface of the second active area of the display panel, a panel housing having a guide rail engaged with a portion of each of the plurality of segments to guide a sliding motion of the display panel, and an auxiliary plate disposed in the panel housing and surrounded by the lower surface of the second active area of the display panel. The auxiliary plate may include a central portion having a first thickness in a thickness direction of the first active area, and an edge portion having a second thickness less than the first thickness in the thickness direction.

According to an embodiment of the disclosure, each of the plurality of segments may include a support area overlapping the second active area of the display panel in a thickness direction of the second active area, and a protruding area that does not overlap the display panel in the thickness direction of the first active area and engages with the guide rail. The central portion of the auxiliary plate may overlap the support area of the each of the plurality of segments in the thickness direction of the first active area, and the edge portion of the auxiliary plate may overlap the protruding area of the each of the plurality of segments in the thickness direction of the first active area.

According to an embodiment of the disclosure, a portion of the second active area may be curved along the auxiliary plate to surround the auxiliary plate, the plurality of segments may include a first segment disposed in the portion of the second active area, and the first segment may be convexly curved in a radial direction of the auxiliary plate.

According to an embodiment of the disclosure, the edge portion of the auxiliary plate may form a level difference with the central portion to form an extra space, and an end of the first segment that is convexly curved may be disposed in the extra space.

According to an embodiment of the disclosure, an end of the auxiliary plate may be convexly curved, and the portion of the second active area may be curved along the end.

According to an embodiment of the disclosure, a housing for accommodating a display panel may include a first housing, a second housing that slides in a first direction from the first housing and has a guide rail guiding a sliding motion of the display panel, and a slide assist member disposed in the second housing and surrounded by the guide rail in a side view. The slide assist member may include a central portion, and a stepped portion protruding from the central portion in a second direction intersecting the first direction to form a level difference with the central portion and form a space with the guide rail.

According to an embodiment of the disclosure, a diameter of the stepped portion may be less than a diameter of the central portion.

According to an embodiment of the disclosure, the central portion may include a first portion and a second portion, the first portion and the second portion having the first diameter and spaced apart from each other in the second direction, and a third portion having a second diameter less than the first diameter and disposed between the first portion and the second portion.

It should be noted that effects of the disclosure are not limited to those described above and other effects of the disclosure will be apparent to those skilled in the art from the following descriptions.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
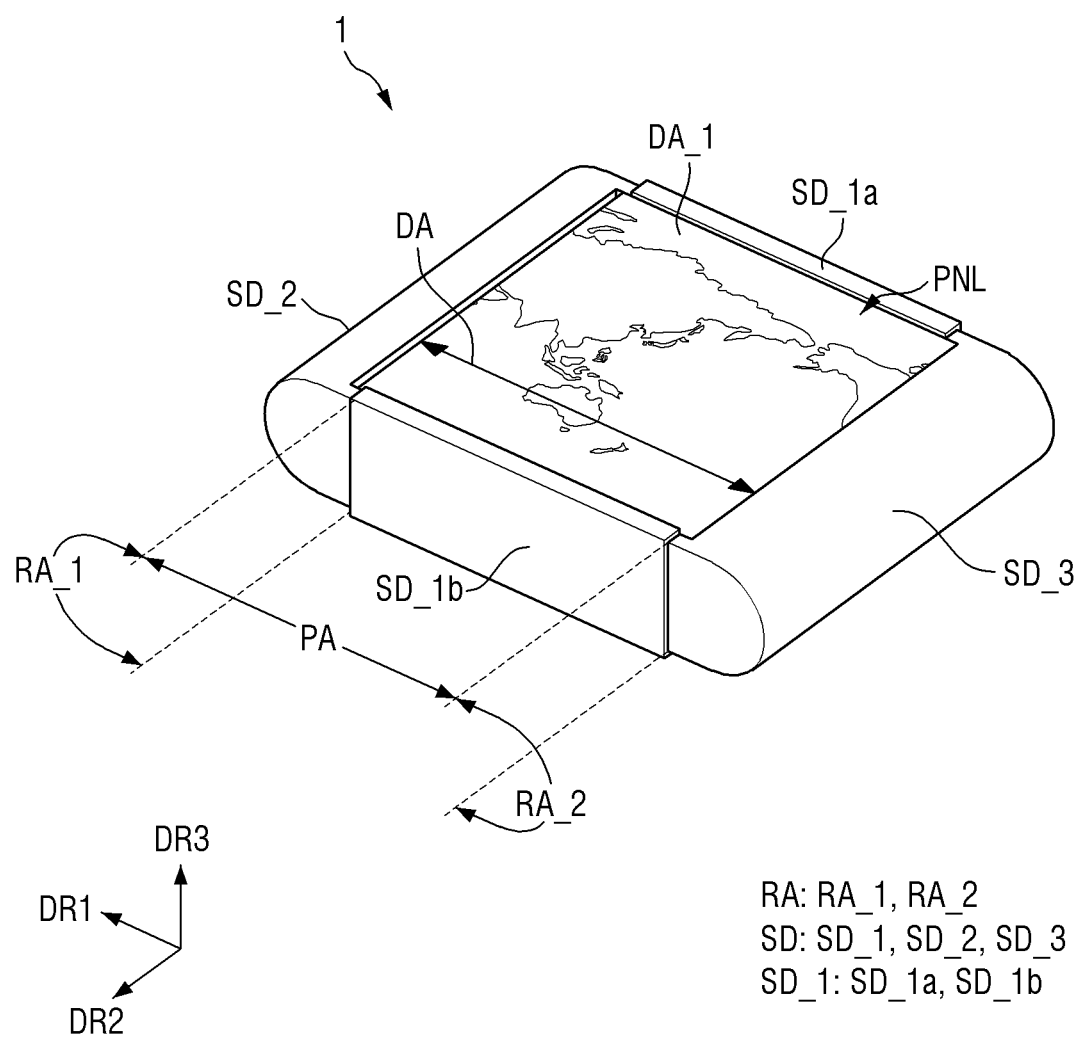
FIG. 1 is a perspective view of a display device according to an embodiment of the disclosure.

The disclosure will now be described more fully hereinafter with reference to the accompanying drawings, in which embodiments of the disclosure are shown. The disclosure may, however, be embodied in different forms and should not be construed as limited to the embodiments set forth herein. Rather, these embodiments are provided so that this disclosure will be more thorough and complete, and will fully convey the scope of the disclosure to those skilled in the art.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. The same reference numbers indicate the same components throughout the specification. In the attached figures, the thickness of layers and regions is exaggerated for clarity.

Further, the first direction DR1, the second direction DR2, and the third direction DR3 are not limited to three axes of a rectangular coordinate system, such as the x, y, and z axes, and may be interpreted in a broader sense. For example, the first direction DR1, the second direction DR2, and the third direction DR3 may be perpendicular to one another, or may represent different directions that are not perpendicular to one another. For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements.

Features of various embodiments of the disclosure may be combined partially or totally. As will be clearly appreciated by those skilled in the art, technically various interactions and operations are possible. Various embodiments can be practiced individually or in combination.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, embodiments of the disclosure will be described with reference to the accompanying drawings.

Figure 2:
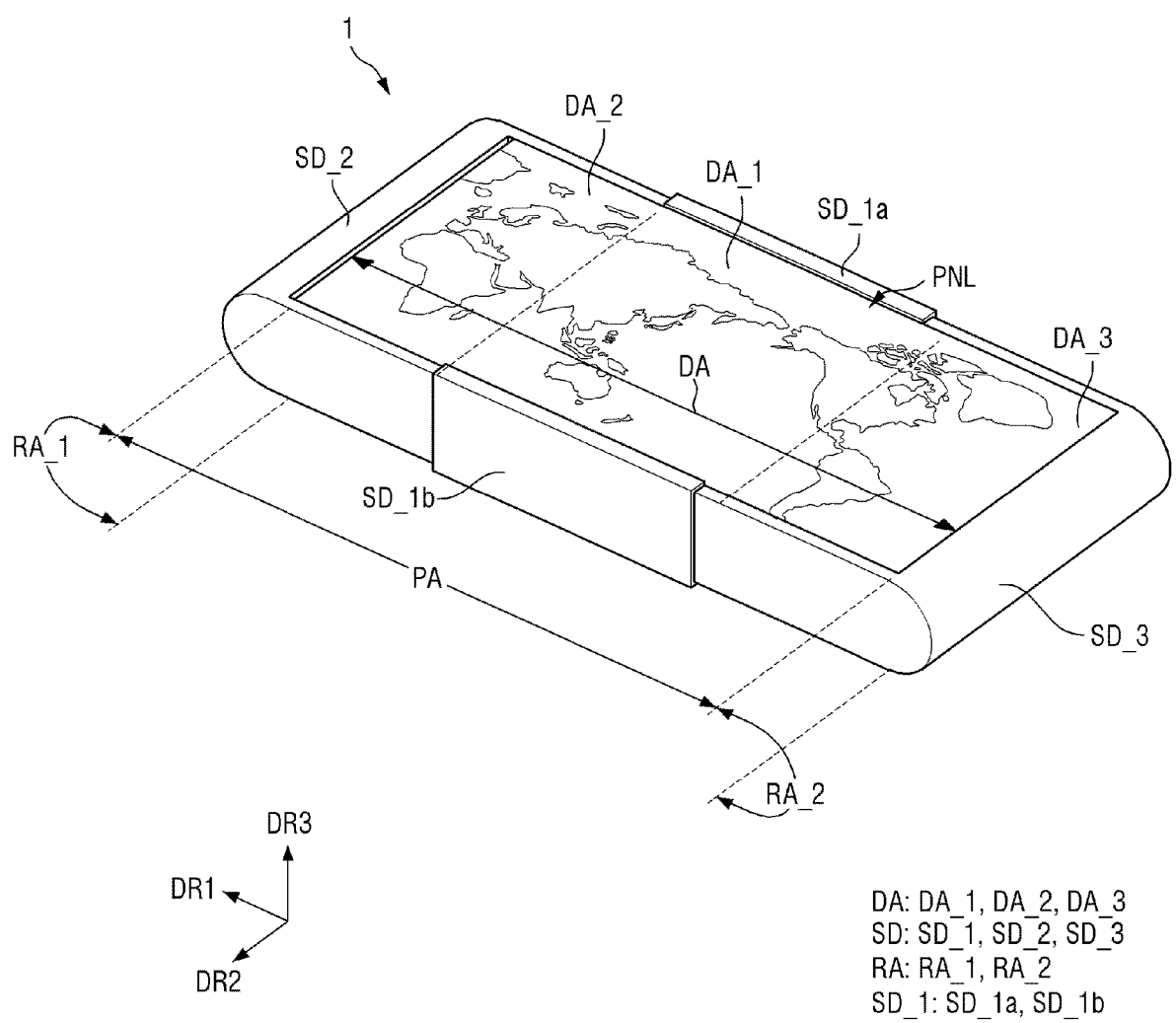
FIG. 2 is a perspective view showing the display device according to the embodiment of FIG. 1 when it is expanded.
Figure 3:
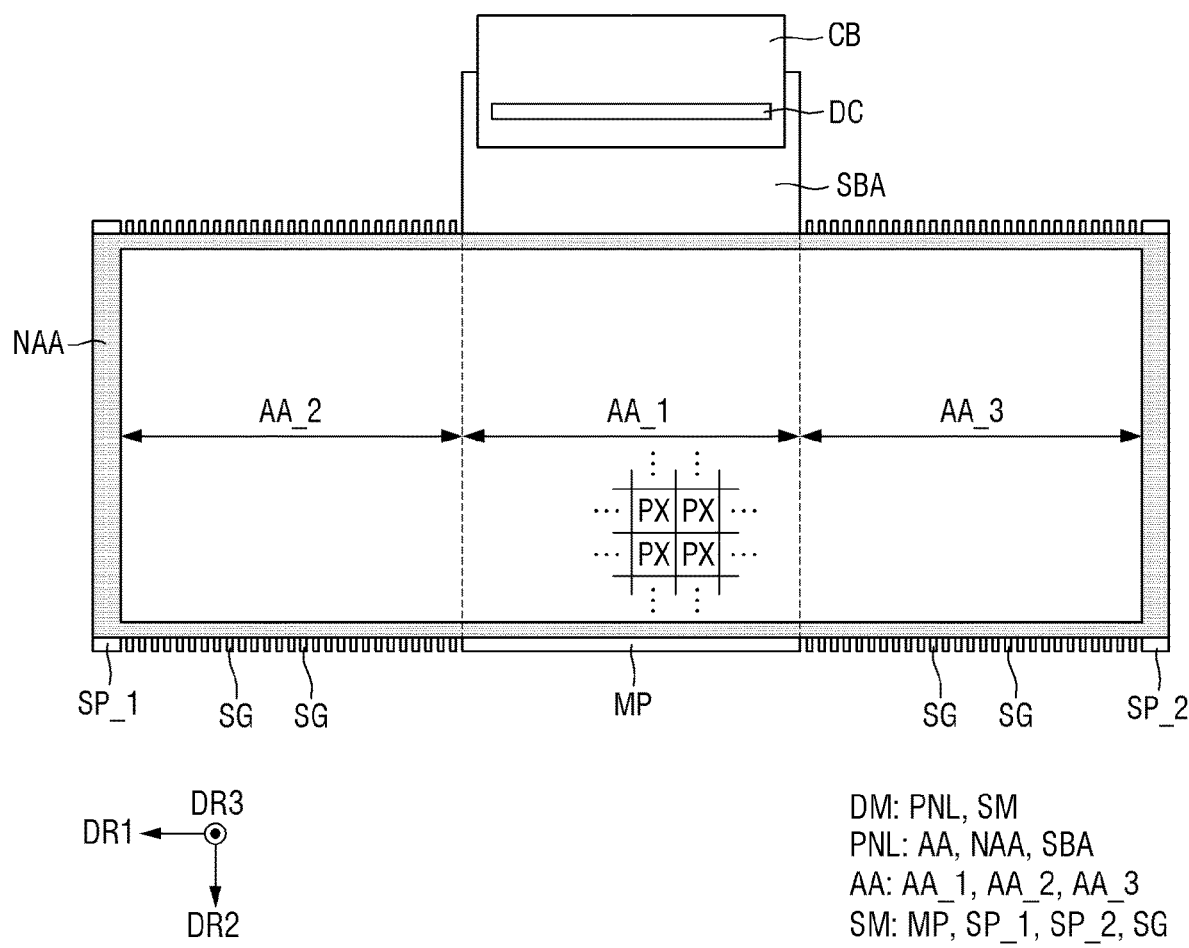
FIG. 3 is a plan view of a display module of the display device according to the embodiment of the disclosure.
Figure 4:
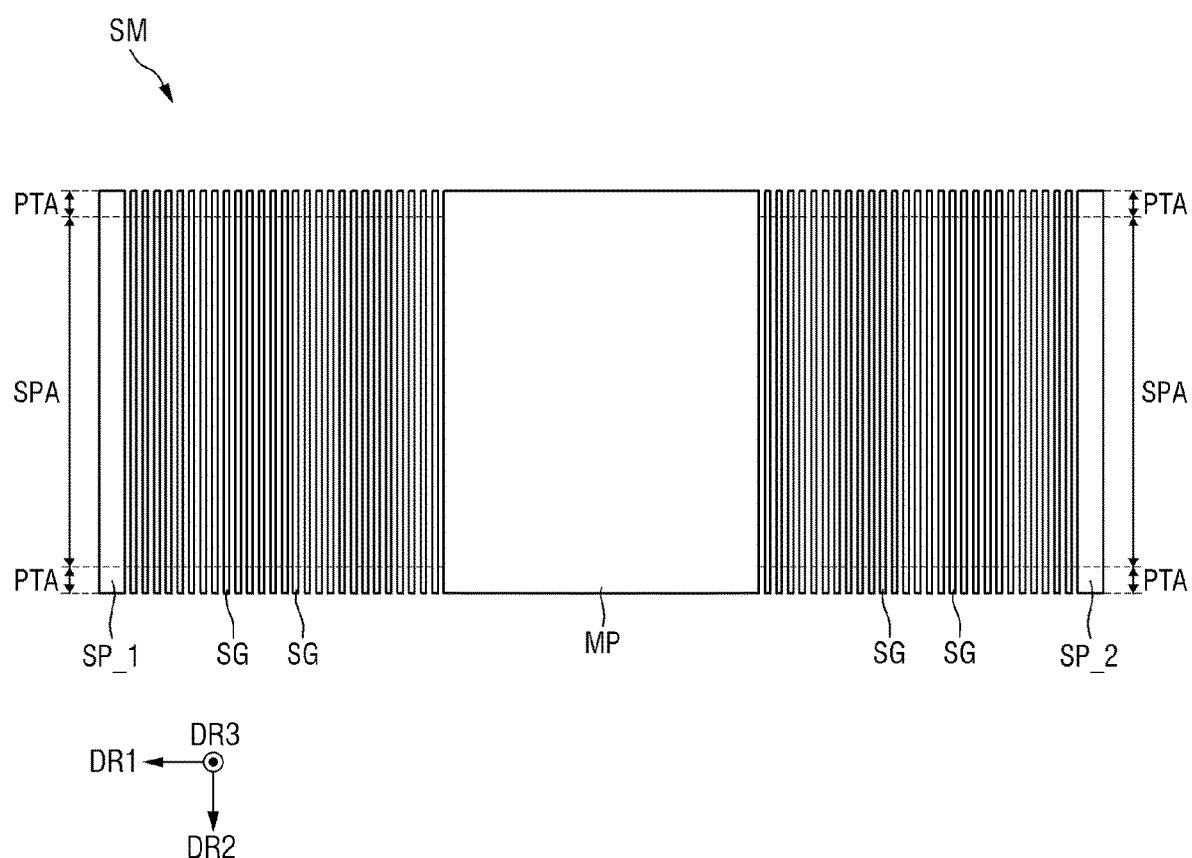
FIG. 4 is a plan view of a panel support of a display module according to an embodiment of the disclosure.
Figure 5:
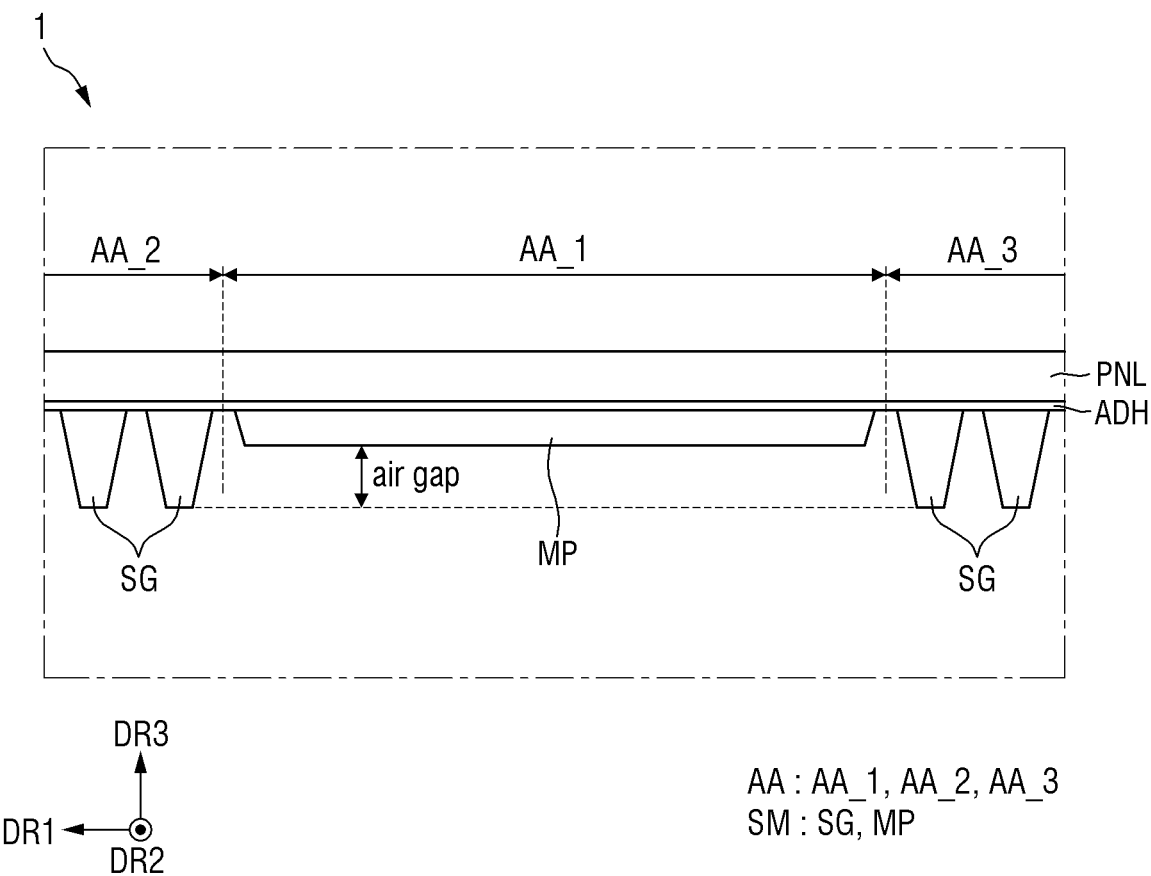
FIG. 5 is a side view of the display module according to the embodiment of the disclosure.

FIG. 1 is a perspective view of a display device according to an embodiment of the disclosure. FIG. 2 is a perspective view showing the display device according to the embodiment of FIG. 1 when it is expanded. FIG. 3 is a plan view of a display module of the display device according to the embodiment of the disclosure. FIG. 4 is a plan view of a panel support of a display module according to an embodiment of the disclosure. FIG. 5 is a side view of the display module according to the embodiment of the disclosure.

In FIG. 1, a first direction DR1, a second direction DR2 and a third direction DR3 are defined. The first direction DR1 and the second direction DR2 may be perpendicular to each other, the first direction DR1 and the third direction DR3 may be perpendicular to each other, and the second direction DR2 and the third direction DR3 may be perpendicular to each other. The first direction DR1 may be a horizontal direction, the second direction DR2 may be a vertical direction, and the third direction DR3 may a thickness direction. As used herein, a direction as well as an opposite direction may be indicated by the arrow, unless specifically stated otherwise. If it is necessary to discern between such two opposite directions, one of the two directions may be referred to as "one side in the direction," or "a direction" while another direction may be referred to as "the opposite side in the direction" or "another direction". In FIG. 1, a direction indicated by the arrow may be referred to as one side (or a side) in the direction, while an opposite direction may be referred to as the opposite side (or another side) in the direction.

In the following description of the surfaces of the display device 1 or the elements of the display device 1, the surfaces facing a side where images are displayed, i.e., the third direction DR3 will be referred to as the upper surface, while the opposite surfaces will be referred to as the lower surface for convenience of illustration. It should be understood, however, that the disclosure is not limited thereto. The surfaces and the opposite surface of the elements may be referred to as a front surface and a rear surface, respectively, or may be referred to as a first surface and a second surface, respectively. In the description of relative positions of the elements of the display device 1, a side in the third direction DR3 may be referred to as an upper side while an opposite side in the third direction DR3 may be referred to as the lower side.

Referring to FIGS. 1 and 2, the display device 1 according to the embodiment may be a sliding display device or a slidable display device that can slide in the first direction DR1. The display device 1 according to the embodiment may be, but is not limited to, a multi-slidable display device that slides in two directions. For example, the display device 1 may be a single slidable display device that slides only in one direction. In the following description, a multi-slidable display device will be described as the display device 1.

The display device 1 may include a plane area PA and rounded areas RA. The plane area PA of the display device 1 may generally overlap an open area of a panel housing SD where a display panel PNL is exposed, which will be described below. The rounded areas RA of the display device 1 may be disposed in the panel housing SD. The rounded areas RA may be curved with a radius of curvature, and the display panel PNL may be curved according to the radius of curvature. The rounded areas RA may be disposed on each side of the plane area PA in the first direction DR1. In an embodiment, a first rounded area RA_1 may be disposed on a side of the plane area PA in the first direction DR1, and a second rounded area RA_2 may be disposed on a side of the plane area PA in an opposite direction of the first direction DR1. In the first rounded area RA_1, a second active area AA_2 of the display panel PNL, which will be described below, may be bent. In the second rounded area RA_2, a third active area AA_3 of the display panel, which will be described below, may be bent. As shown in FIG. 2, an area of the plane area PA may increase as the display device 1 expands. Accordingly, the distance between the first rounded area RA_1 and the second rounded area RA_2 may increase.

Referring to FIGS. 3 to 5 in conjunction with FIGS. 1 and 2, the display device according to an embodiment may include a display module DM, and a panel housing SD.

The display module DM may include a display panel PNL and a panel support SM.

The display panel PNL of the display module DM may include multiple pixels PX to display images thereon. Any kind of display panel may be employed as the display panel PNL according to the embodiment, such as an organic light-emitting display panel including an organic light-emitting layer, a micro light-emitting diode display panel using micro LEDs, a quantum-dot light-emitting display panel using quantum-dot light-emitting diodes including quantum-dot light-emitting layer, and an inorganic light-emitting display panel using inorganic light-emitting elements including an inorganic semiconductor.

The display panel PNL may be a flexible panel. The display panel PNL may have flexibility so that it can be at least partially rolled, bent, or curved in the panel housing SD, as will be described below. The display panel PNL may slide in the first direction DR1.

The display panel PNL may include an active area AA and a non-active area NAA.

In the active area AA of the display panel PNL, multiple pixels PX may be disposed. The active area AA may include a first active are AA_1 supported by a main plate MP, which will be described below, a second active area AA_2 supported by multiple segments SG, and a third active area AA_3 supported by multiple segments SG. The first active area AA_1 of the display panel PNL may be always flat that maintains a flat shape regardless of the sliding motion.

Each of the second active area AA_2 and the third active area AA_3 of the display panel PNL may be either a bent area that is rolled, bent, or curved, or a bendable area changing between a rolled, bent, or curved shape and a flat shape according to the sliding motion of the display device 1. The second active area AA_2 and the third active area AA_3 of the display panel PNL may be bent along a roller 110 (see FIG. 6).

In the display area DA of the display panel PNL, images may be displayed. The display area DA may be divided into a first display area DA_1, a second display area DA_2, and a third display area DA_3 depending on whether the display panel PNL slides or not and on how far it slides if it slides. The presence of the second display area DA_2 and the third display area DA_3 may depend on whether the display panel PNL slides or not, and the areas of the second display area DA_2 and the third display area DA_3 may vary depending on how far it slides. For example, in case that the display panel PNL does not slide, the display panel PNL may include the first display area DA_1 having a first area. In case that the display panel PNL slides, the display area DA may further include the second display area DA_2 and third display area DA_3 in addition to the first display area DA_1.

The first display area DA_1 may overlap the first active area AA_1 of the display panel PNL in the third direction DR3. The second display area DA_2 may overlap at least a part of the second active area AA_2 of the display panel PNL in the third direction DR3. The third display area DA_3 may overlap at least a part of the third active area AA_3 of the display panel PNL in the third direction DR3. For example, in the second display area DA_2, the second active area AA_2 of the display panel PNL and the plane area PA may overlap each other in the third direction DR3. In the third display area DA_3, the third active area AA_3 of the display panel PNL and the plane area PA may overlap each other in the third direction DR3.

In an embodiment, a boundary between the first display area DA_1 and the second display area DA_2 may coincide with a boundary between the first active area AA_1 and the second active area AA_2, and a boundary between the first display area DA_1 and the third display area DA_3 may coincide with a boundary between the first active area AA_1 and the third active area AA_3. It should be understood, however, but the disclosure is not limited thereto.

The areas of the second display area DA_2 and the third display area DA_3 may vary depending on how far the display device 1 slides. For example, in a plan view, in case that the display device 1 slides to the maximum, the second display area DA_2 may have a second area, the third display area DA_3 may have a third area, and the display area DA may have a fourth area which is the sum of the first area, the second area, and the third area. The fourth area may be a maximum area that the display area DA can have.

In the non-active area NAA of the display panel PNL, no pixel PX may be disposed. In the non-active area NAA, metal lines such as a data/scan lines, touch lines, and supply voltage lines may be disposed.

The display panel PNL may further include a subsidiary area SBA. The subsidiary area SBA may be disposed on a side of the first active area AA_1 of the display panel PNL in an opposite direction of the second direction DR2. For example, the subsidiary area SBA may protrude from the non-active area NAA in the opposite direction of the second direction DR2.

The subsidiary area SBA may overlap the first active are AA_1 in the second direction DR2 and may not overlap the second active area AA_2 and the third active area AA_3 in the second direction DR2.

In an embodiment, the subsidiary area SBA may have, but is not limited to, a rectangular shape in a plan view. In an embodiment, the length of the subsidiary area SBA in the first direction DR1 may be substantially equal to the length of the first active area AA_1 in the first direction DR1. It should be understood, however, that the disclosure is not limited thereto. In another embodiment, the length of the subsidiary area SBA in the first direction DR1 may be less than the length of the first active area AA_1 in the first direction DR1. The length of the subsidiary area SBA in the second direction DR2 may be less than the length of the first active area AA_1 in the second direction DR2.

The subsidiary area SBA may be a folded, curved, or bent. In case that the subsidiary area SBA is bent, the subsidiary area SBA may be disposed in a space where the second active area AA_2 and the third active area AA_3 of the display panel PNL are bent or rolled while the display device 1 is not expanded, and may overlap the first active area AA_1 in the third direction DR3. With the above-described configuration, the display device 1 according to the embodiment may have a large internal space while reducing the thickness caused by the bending of the display panel PNL.

A driver circuit DC and a circuit board CB may be disposed on a surface of the subsidiary area SBA adjacent to a side in the third direction DR3.

The circuit board CB may be attached on an upper surface of the subsidiary area SBA using an anisotropic conductive film (ACF). The circuit board CB may be electrically connected to a pad area formed on the subsidiary area SBA. The circuit board CB may be a flexible printed circuit board (FPCB), a printed circuit board (PCB), or a flexible film such as a chip-on-film (COF).

The driver circuit DC may be implemented as an integrated circuit (IC) and may be attached to the subsidiary area SBA by a chip-on-glass (COG) technique, a chip-on-plastic (COP) technique, or ultrasonic bonding. In another embodiment, the driver circuit DC may be mounted on the circuit board CB.

The panel support SM of the display module DM may support the bottom surface of the display panel PNL. The panel support SM may be attached to the bottom surface of the display panel PNL to support the display panel PNL.

An adhesive ADH may be interposed between the panel support SP and the display panel PNL. In an embodiment, the adhesive ADH may be, but is not limited to, a pressure sensitive adhesive (PSA). The panel support SM may include a main plate MP, a first sub-plate SP_1, a second sub-plate SP_2, and multiple segments SG.

The main plate MP may support the first active area AA_1 of the display panel PNL. In an embodiment, the main plate MP may support the first active area AA_1 of the display panel PNL as well as a part of the non-active area NAA adjacent to the first active area AA_1. The main plate MP may be disposed between the segments SG supporting the second active area AA_2 and the segments SG supporting the third active area AA_3 in the first direction DR1. The main plate MP and the first active area AA_1 of the display panel PNL may overlap each other in the third direction DR3.

The main plate MP may have a shape extended in the first direction DR1 and the second direction DR2 in a plan view. In an embodiment, the main plate MP may have a generally flat upper surface. The main plate MP may have a uniform width in the third direction DR3 along the profile of the first active area AA_1 of the display panel PNL.

A surface of the main plate MP in the third direction DR3 may be an upper surface where the first active area AA_1 of the display panel PNL is attached, and an opposite surface of the main plate MP in the third direction DR3 may be a lower surface where an air gap is formed, which will be described below.

The segments SG may support the second active area AA_2 and the third active area AA_3 of the display panel PNL. For example, the segments SG may support a part of the non-active area NAA adjacent to the second active area AA_2 and the second active area AA_3 in addition to the second active area AA_2 and the third active area AA_3 of the display panel PNL. The segments SG may be disposed on each side of the main plate MP in the first direction DR1.

Each of the segments SG may extend in the second direction DR2 and may be spaced apart from one another in the first direction DR1. Since each of the segments SG has a width in the second direction DR2 that is greater than the width of the display panel PNL in the second direction DR2, the segments SG may protrude from the display panel PNL in the second direction DR2 in a plan view. In an embodiment, each of the segments SG may include a support area SPA covered by the display panel PNL, and protruding areas PTA not covered by the display panel PNL as shown in FIGS. 3 and 4. As described above, the support area SPA of each of the segments SG may support the bottom surface of the display panel PNL, and the protruding areas PTA of each of the segments SG may be engaged with the guide rails GR formed on the panel housing SD (see FIG. 8). This will be described in more detail below.

The width of each of the segments SG in the third direction DR3 may be greater than the thickness of the main plate MP in the third direction DR3. Accordingly, an air gap (or a space) may be formed under the main plate MP as shown in FIG. 5. As the air gap is formed under the main plate MP, a shock applied to the display panel PNL may be mitigated. For example, the air gap may absorb a shock in case that an object such as a user's pen drops onto the first active area AA_1 of the display panel PNL.

The first sub-plate SP_1 may support a part of the non-active area NAA disposed adjacent to the second active area AA_2 in the first direction DR1. The second sub-plate SP_2 may support a part of the non-active area NAA disposed adjacent to the third active area AA_3 in an opposite direction of the first direction DR1. Each of the first sub-plate SP_1 and the second sub-plate SP_2 may have a shape generally extending in the second direction DR2, and may have a width that is greater than the width of each of the segments SG in the first direction DR1.

Since each of the first sub-plate SP_1 and the second sub-plate SP_2 has a width in the second direction DR2 that is greater than the width of the display panel PNL in the second direction DR2, each of the first sub-plate SP_1 and the second sub-plate SP_2 may protrude from the display panel PNL in the second direction DR2. In an embodiment, each of the first sub-plate SP_1 and the second sub-plate SP_2 may include protruding areas PTA not covered by the display panel PNL. The protruding areas PTA of the first sub-plate SP_1 and the second sub-plate SP_2 may be engaged with the guide rails formed in the panel housing SD. This will be described in more detail below.

The main plate MP, the first sub-plate SP_1 and the second sub-plate SP_2, and the segments SG may have substantially the same relative positional relationship with respect to the display panel PNL. For example, in case that the display panel PNL is flat without bending, at least one plane parallel to the display panel PNL may pass through the main plate MPL, the first sub-plate SP_1, the second sub-plate SP_2, and the segments SG.

As shown in FIGS. 1 and 2, the panel housing SD may accommodate at least a part of the display panel PNL, and may assist the sliding motion of the display device 1. The panel housing SD may include a first housing SD_1 disposed at the center of the display device 1, a second housing SD_2 disposed on a side of the first housing SD_1 in the first direction DR1 and comprising the first rounded area RA_1, and a third housing SD_3 disposed on a side of the first housing SD_1 in an opposite direction the first direction DR1 and comprising the second rounded area RA_2.

The first housing SD_1 may connect the second housing SD_2 with the third housing SD_3. For example, the first housing SD_1 may include a first sidewall housing SD_1a connecting a side of the second housing SD_2 in an opposite direction of the second direction DR2 with a side of the third housing SD_3 in the opposite direction of the second direction DR2; and a second sidewall SD_1b connecting a side of the second housing SD_2 in the second direction DR2 with a side of the third housing SD_3 in the second direction DR2.

The guide rails GR may be formed in the second housing SD_2 and the third housing SD_3 to guide the sliding motion of the display panel PNL.

Hereinafter, it will be described how the second housing SD_2 and the third housing SD_3 of the panel housing SD guide the sliding motion of the display module DM.

Figure 6:
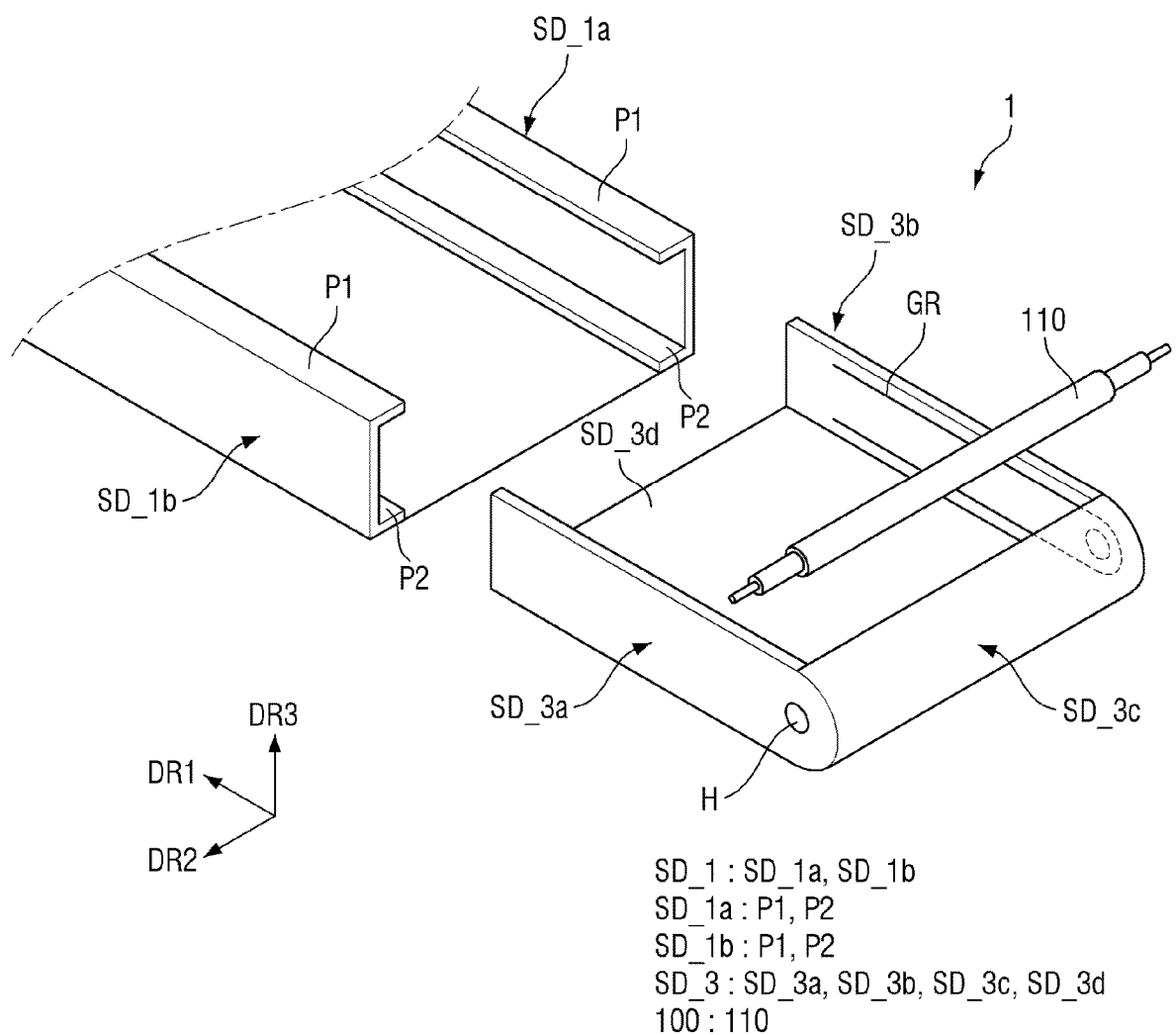
FIG. 6 is an exploded, perspective view of a panel protruding of a display device according to an embodiment.
Figure 7:
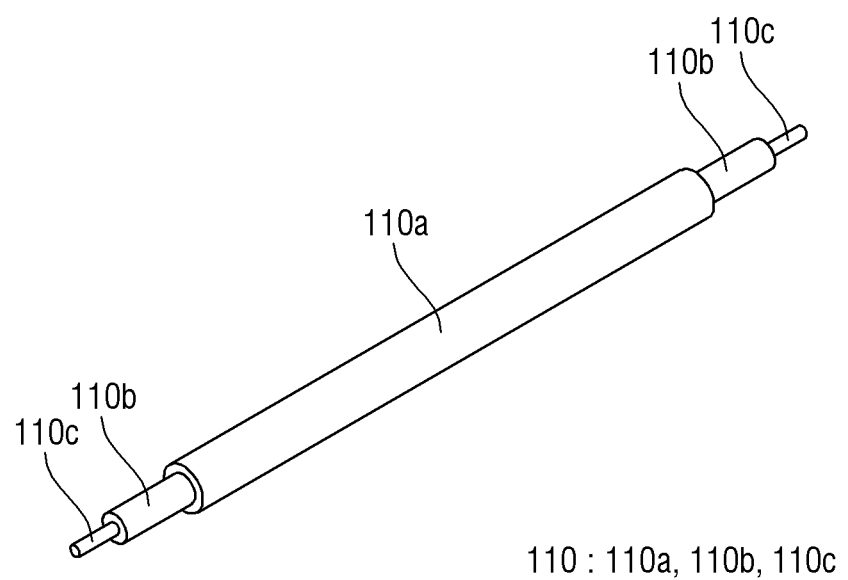
FIG. 7 is a perspective view schematically showing the roller of FIG. 6.
Figure 8:
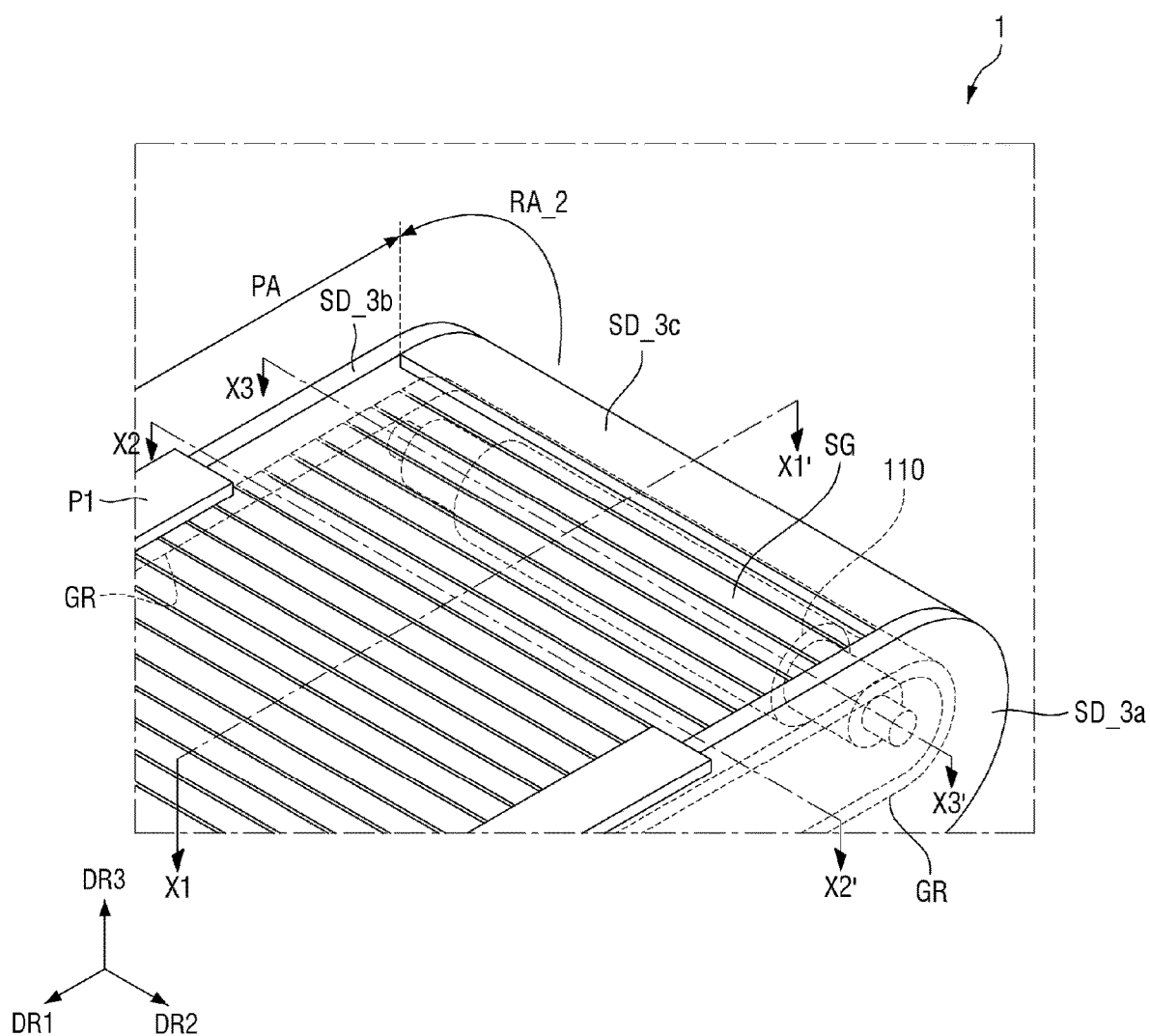
FIG. 8 is a perspective view showing the structure in which the panel housing according to the embodiment is coupled with the display module.

FIG. 6 is an exploded, perspective view of a panel housing of a display device according to an embodiment. FIG. 7 is a perspective view schematically showing the roller of FIG. 6. FIG. 8 is a perspective view showing the structure in which the panel housing according to the embodiment is coupled with the display module. In FIG. 8, the display panel PNL of the display module DM is not depicted for convenience of illustration, and it is illustrated that the segments SG are engaged with the guide rails GR.

Referring to FIGS. 6 to 8 in conjunction with FIGS. 1 and 2, the panel housing SD may accommodate the display panel PNL and at least a part of the panel support SM, and may guide the sliding motion of the display device 1. The panel housing SD may include a first housing SD_1 disposed at the center of the display device 1, a second housing SD_2 disposed on a side of the first housing SD_1 in the first direction DR1 and bending (or rolling) the second active area AA_2 of the display panel PNL, and a third housing SD_3 disposed on a side of the first housing SD_1 in an opposite direction of the first direction DR1 and bending (or rolling) the third active area AA_3 of the display panel PNL. The first housing SD_1 may connect the second housing SD_2 with the third housing SD_3. Guide rails GR may be formed on inner surfaces of the second housing SD_2 and the third housing SD_3 to guide the sliding operations of the display panel PNL.

For example, the first housing SD_1 may include a first sidewall SD_1a on a side in an opposite direction of the second direction DR2, and a second sidewall SD_1b on a side in the second direction DR2. A part of the display panel PNL may be exposed between the first sidewall SD_1a and the second sidewall SD_1b. At each end of each of the first sidewall SD_1a and the second sidewall SD_1b in the third direction DR3, fixing portions protruding in the second direction DR2, i.e., toward the inside of the first housing SD_1, may be formed. In an embodiment, a first fixing portion P1 may be formed at an end of each of the first sidewall SD_1a and the second sidewall SD_1b in the third direction DR3, and a second fixing portion P2 may be formed at an opposite end of each of the first sidewall SD_1a and the second sidewall SD_1b in the third direction DR3. The first fixing portion P1 and the second fixing portion P2 may face each other in the third direction DR3. Accordingly, the third housing SD_3 may be engaged and slid in a space formed between the first fixing portion P1 and the second fixing portion P2. Since the sliding movement of the second housing SD_2 is substantially identical to the sliding movement of the third housing SD_3, the sliding movement of the third housing SD_3 will be described, and the sliding movement of the second housing SD_2 will not be described.

The third housing SD_3 may include guide portions on each side in the second direction DR2. For example, the third housing SD_3 may include a first guide portion SD_3a on a side in the second direction DR2, and a second guide portion SD_3b on an opposite side in the second direction DR2. The guide portions SD_3a and SD_3b may have a flat plate shape having a plane defined by the first direction DR1 and the third direction DR3. The guide portions SD_3a and SD_3b may be engaged with the first fixing portion P1 and the second fixing portion P2 formed on each of the first sidewall SD_1a and the second sidewall SD_1b of the first housing SD_1 to slide in the first direction DR1.

Guide rails GR may be formed on the first guide portion SD_3a and the second guide portion SD_3b of the third housing SD_3, so that the protruding areas PTA of the segments SG engage with them. The guide rails GR may define a track along which the display module DM slides. The guide rails GR may be grooves formed on the first guide portion SD_3a and the second guide portion SD_3b, so that the protruding area PTA of each of the segments SG engages with them, as shown in FIG. 8.

The guide rails GR may have a U-shape rotated by 90° counterclockwise in a side view. For example, the guide rails GR may have a substantially convex shape toward a side of the third housing SD_3, i.e., toward a side in an opposite direction of the first direction DR1. For example, the guide rails GR may extend in an opposite direction of the first direction DR1, bent an opposite direction of the third direction DR3 similar to the display module DM is bent, and extend in the first direction DR1.

Holes H may be formed on the guide portions SD_3a and SD_3b where the guide rails GR are bent for disposing a roller 110, which will be described below. The guide rails GR may have a shape surrounding portions of the holes H in a side view.

The third housing SD_3 may include a cover portion SD_3c connecting the first guide portion SD_3a with the second guide portion SD_3b. The cover portion SD_3c may prevent the bent portion of the display module DM from being seen from the outside.

The third housing SD_3 may include a bottom portion SD_3d connecting the first guide portion SD_3a, the second guide portion SD_3b, and the cover portion SIDE_3c. The bottom portion SD_3d may form a surface of the third housing SD_3 on a side in an opposite direction of the third direction DR3, for example, a bottom surface.

The panel housing SD may further include a slide assist member 100. The slide assist member 100 may be surrounded by the display module DM that is guided by the guide rails GR and bent. Accordingly, the slide assist member 100 may be disposed between the guide rails GR. For example, the slide assist member 100 may be disposed between the guide rails GR in a plan view.

The slide assist member 100 may be an element surrounded by the display module DM and may allow for stable sliding movement of the display module DM.

The slide assist member 100 may include a roller 110. The roller 110 may assist the sliding movement of the display panel PNL. For example, as shown in FIG. 8, the display module DM may surround the roller 110 along the guide rails GR, and thus the roller 110 may support a portion of the display module DM that is curved in the second rounded area RA_2 of the display device 1 to facilitate the sliding movement. In other words, in case that the display device 1 slides, the roller 110 may rotate with the movement of the display module DM, so that the display device may slide smoothly.

The roller 110 may be in a generally cylindrical shape having a circular cross-section. The roller 110 may have a shape in which cylinders having different diameters are joined. For example, the roller 110 may include a central portion 110a, stepped portions 110b, and protrusions 110c, as shown in FIG. 7.

The central portion 110a of the roller 110 may comprise most of the roller 110 and may have a cylindrical shape having a first diameter. The central portion 110a may overlap the support area SPA of the segments SG to support the display module DM, as will be described below. In an embodiment, the central portion 110a may be disposed at a center of the roller 110, but the disclosure is not limited thereto.

The stepped portions 110b of the roller 110 may protrude in the second direction DR2 from each end of the central portion 110a in the second direction DR2. The stepped portions 110b may have a cylindrical shape having a second diameter less than the first diameter of the central portion 110a. Accordingly, as steps are formed in the roller 110, an extra space EXS in which the segments SG engaged with the guide rails GR can be curved, may be provided, as will be described below (see FIG. 11). This will be described in more detail below.

The protrusions 110c of the roller 110 may protrude from the stepped portions 110b in the second direction DR2 and may be inserted into and fixed to holes H formed on the guide portions of the third housing SD_3. In an embodiment, the protrusions 110c may have a cylindrical shape having a third diameter less than the second diameter of the stepped portions 110b, but the disclosure is not limited thereto.

Hereinafter, the arrangement relationship between the display module DM and the slide assist member 100 accommodated in the panel housing SD will be described in detail.

Figure 9:
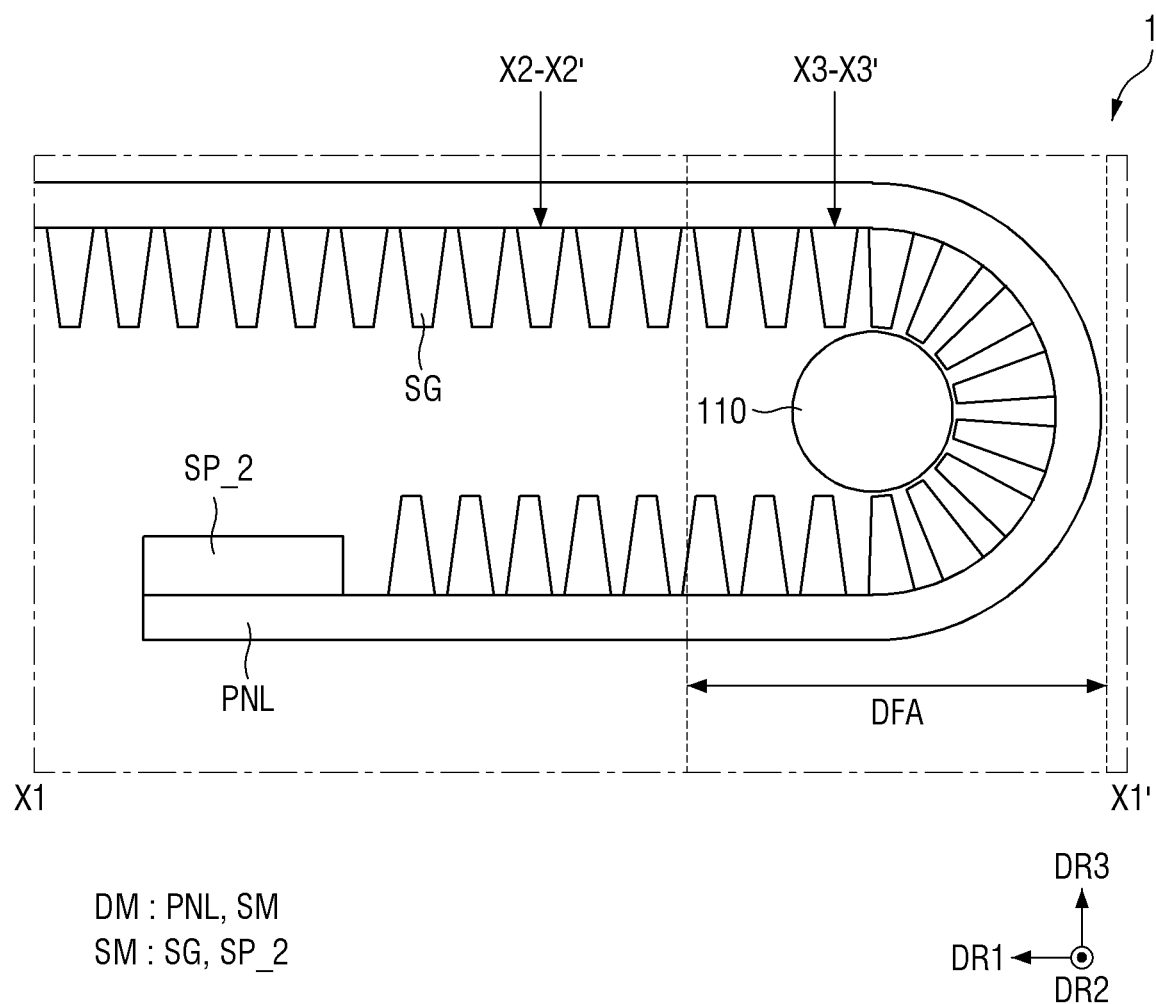
FIG. 9 is a schematic cross-sectional view schematically showing a cross section taken along line X1-X1' of FIG. 8.
Figure 10:
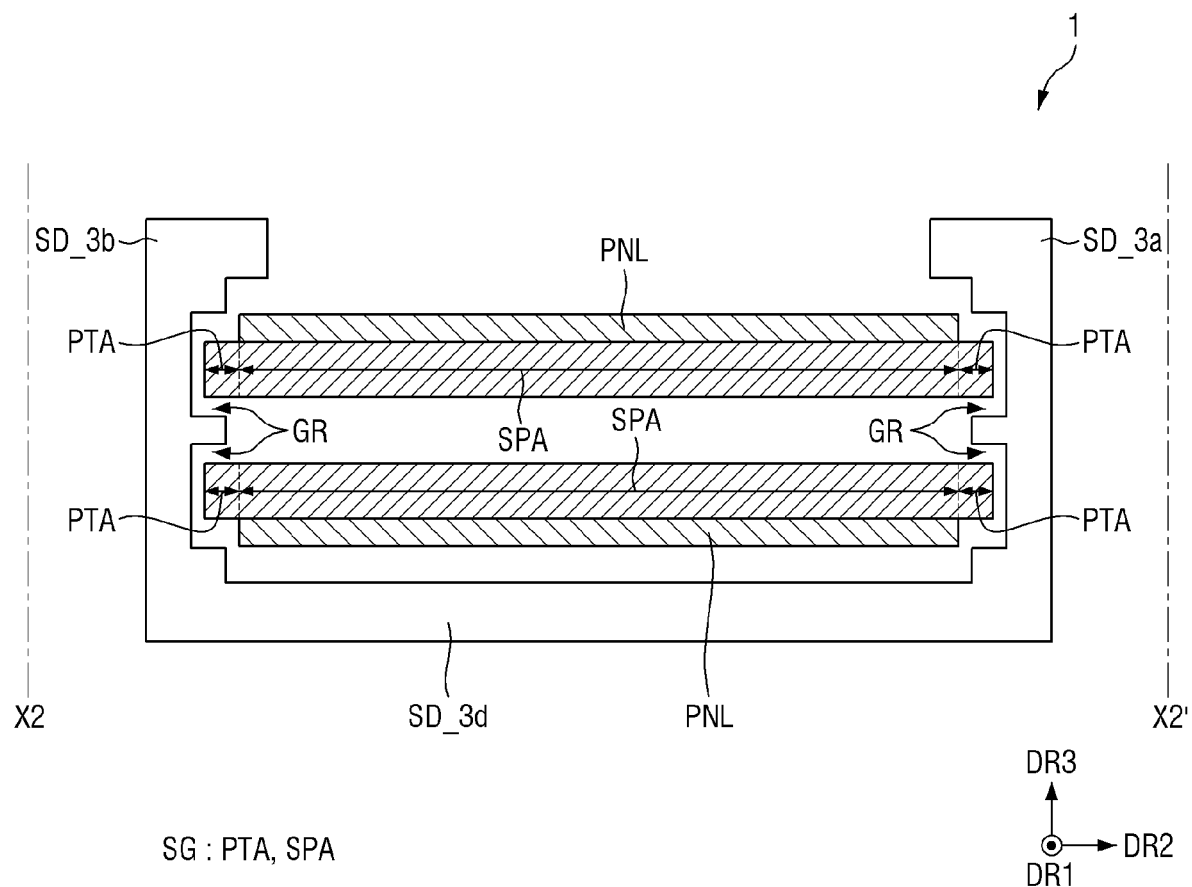
FIG. 10 is a schematic cross-sectional view taken along line X2-X2' of FIG. 8.
Figure 11:
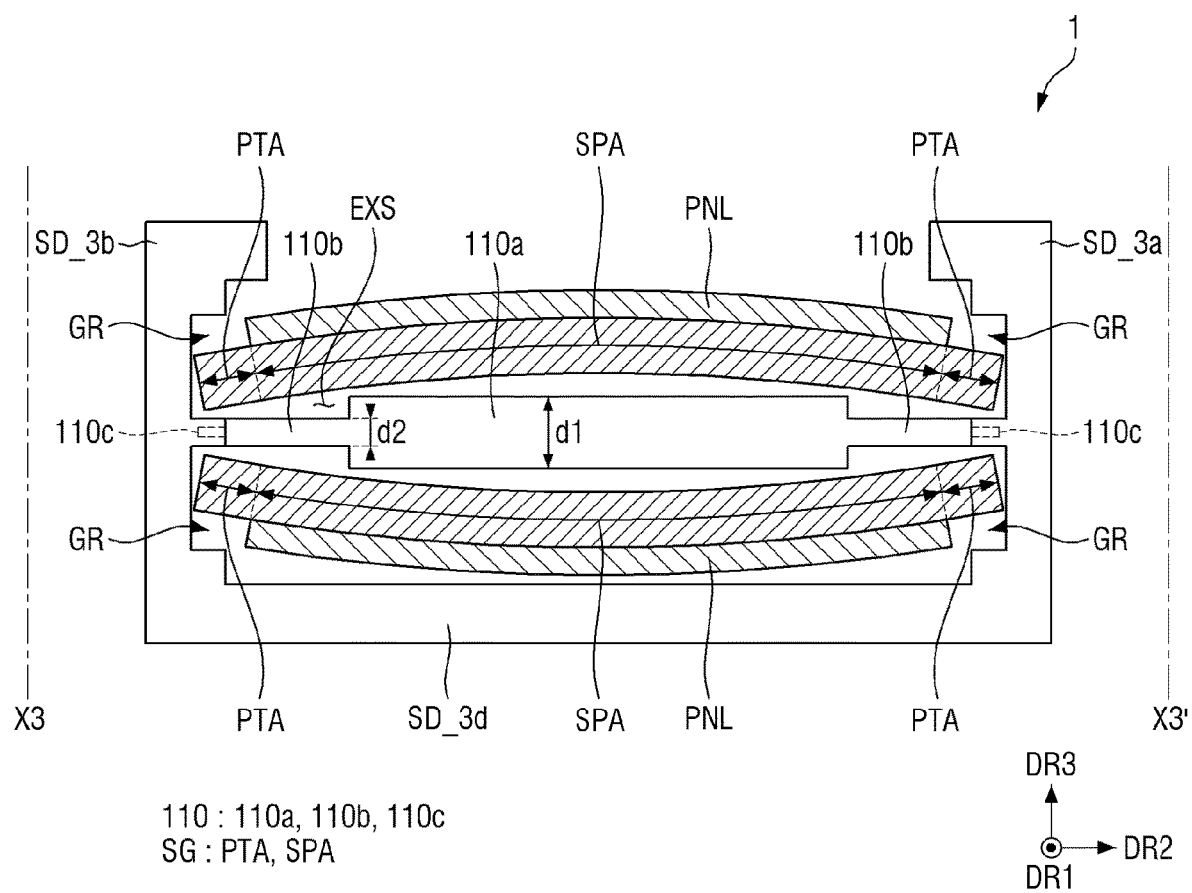
FIG. 11 is a schematic cross-sectional view taken along line X3-X3' of FIG. 8.

FIG. 9 is a schematic cross-sectional view schematically showing a cross section taken along line X1-X1' of FIG. 8. FIG. 10 is a schematic cross-sectional view taken along line X2-X2' of FIG. 8. FIG. 11 is a schematic cross-sectional view taken along line X3-X3' of FIG. 8.

FIG. 9 shows the display module DM surrounding the roller 110. FIG. 10 shows the segments SG engaged with the guide rails GR at an area of the display device 1 where the segments SG are not bent. FIG. 11 shows the segment SG is curved in the deformation area DFA of the display device 1 and is partially located in the extra space EXS provided by the roller 110.

First, referring to FIG. 9, the display module DM may surround the roller 110 along the guide rails GR (see FIG. 8) as described above. Accordingly, the third active area AA_3 of the display panel PNL may be bent along the roller 110, and the bottom surface of the third active area AA_3 may surround the roller 110.

The segments SG may be disposed between the roller 110 and the display panel PNL. The segments SG may follow the shape of the display panel PNL where the display panel PNL is curved, and accordingly the segments SG may be arranged to surround the roller 110.

In case that the display panel PNL is curved, the display panel PNL may be curved (or bent) toward the outside of the display device 1 by elastic deformation of element layers forming the display panel PNL. For example, the display panel PNL may be curved near the roller 110, and accordingly, the segments SG attached to the bottom surface of the display panel PNL may also be curved along the shape of the display panel PNL. FIG. 9 shows a deformation area DFA where the segments SG are curved due to the curve or bending of the display panel PNL.

The roller 110 may be disposed substantially within the deformation area DFA. Accordingly, in order to prevent the segments SG from being bent and in contact with the roller 110 in the deformation area DFA, it may be necessary to form steps in the roller 110 to provide an available space in which the segments SG may be bent, i.e., an extra space EXS.

Referring to FIG. 8, the segments SG may have its original shape in areas other than the deformation area DFA. For example, the segments SG may have a shape extending generally in the second direction DR2 in areas other than the deformation area DFA. This is because the elastic deformation of the element layers forming the display panel PNL does not occur in areas other than the deformation area DFA. Accordingly, the protruding areas PTA of the segments SG may be stably engaged in the guide rails GR such that the segments SG are equally spaced apart from one another in areas other than the deformation area DFA.

On the other hand, referring to FIG. 9, at least one of the segments SG may be curved outwardly of the display device 1 and may be bent outwardly from the roller 110 in the deformation area DFA. For example, the segments SG may be curved in a convex shape in the third direction DR3 (or a radial direction) with respect to the roller 110.

Accordingly, the segment SG curved in the deformation area DFA may be bent in the third direction DR3 compared to the segment SG that is not deformed as shown in FIG. 11. For example, the segment SG disposed on the roller 110 in the third direction DR3 may be convexly curved in the third direction DR3, and the segment SG disposed on the roller 110 in an opposite direction of the third direction DR3 may be convexly curved in an opposite direction of the third direction DR3, such that a central portion of the segment SG may be disposed adjacent to the bottom portion SD_3d of the third housing SD_3.

The segments SG may bend such that the protruding areas PTA of the segments SG move from the guide rails GR toward the central portion of the first guide portion SD_3a and the second guide portion SD_3b, i.e., where the protrusions 110c of the roller 110 are mounted, and thus the protruding areas PTA of the segments SG may be disposed adjacent to the stepped portions 110b, and the support area SPA of the segments SG may be curved convexly in a radial direction of the roller 110.

In case that the segments SG are bent, since the extra space EXS is formed on the roller 110 by the level difference between the central portion 110a having the first diameter d1 and the stepped portions 110b having the second diameter d2, an end of the curved segment SG may be located in the extra space EXS and may be curved stably. In an embodiment, a difference between the first diameter d1 and the second diameter d2 may be, but is not limited to, greater than or equal to about 0.2 mm.

In case that no step is formed in the roller 110, for example, in case that the stepped portions 110b are not formed, ends of the curved segment SG may contact the roller 110, and an upper surface of the display panel PNL may be elevated. As a result, the display panel PNL may contact the guide portions SD_3a and SD_3b or the cover portion SD_3c of the third housing SD_3 and damaged, and accordingly defects such as defective screen may occur.

In view of the above, according to the embodiment, the stepped portions 110b may be formed on the roller 110 in the display device 1 to provide a space in which the segments SG can be bent, so that it may be possible to reduce the interference between the display module DM and the panel housing SD.

In an embodiment, the central portion 110a of the roller 110 may overlap the support area SPA of the segments SG but not with the protruding areas PTA in the third direction DR3 (or a radial direction of the roller 110). In an embodiment, the stepped portions 110b of the roller 110 may overlap at least a portion of the support area SPA and a portion of the protruding areas PTA of the segments SG in the third direction DR3 (or a radial direction of the roller 110).

Hereinafter, a display device 1 according to other embodiments of the disclosure will be described. In the following description, the same or similar elements will be denoted by the same or similar reference numerals, and redundant descriptions will be omitted or briefly described.

Figure 12:
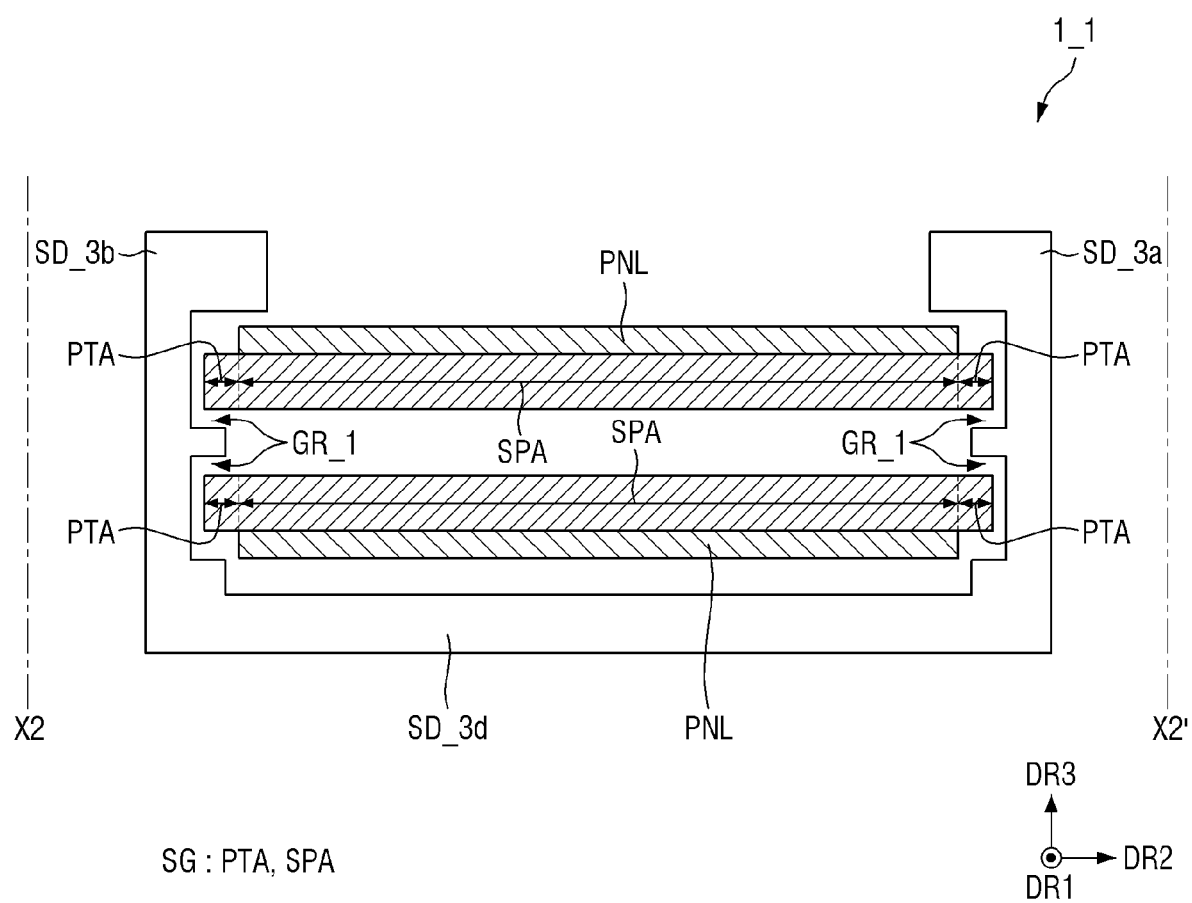
FIG. 12 is a schematic cross-sectional view of a display device according to another embodiment of the disclosure.
Figure 13:
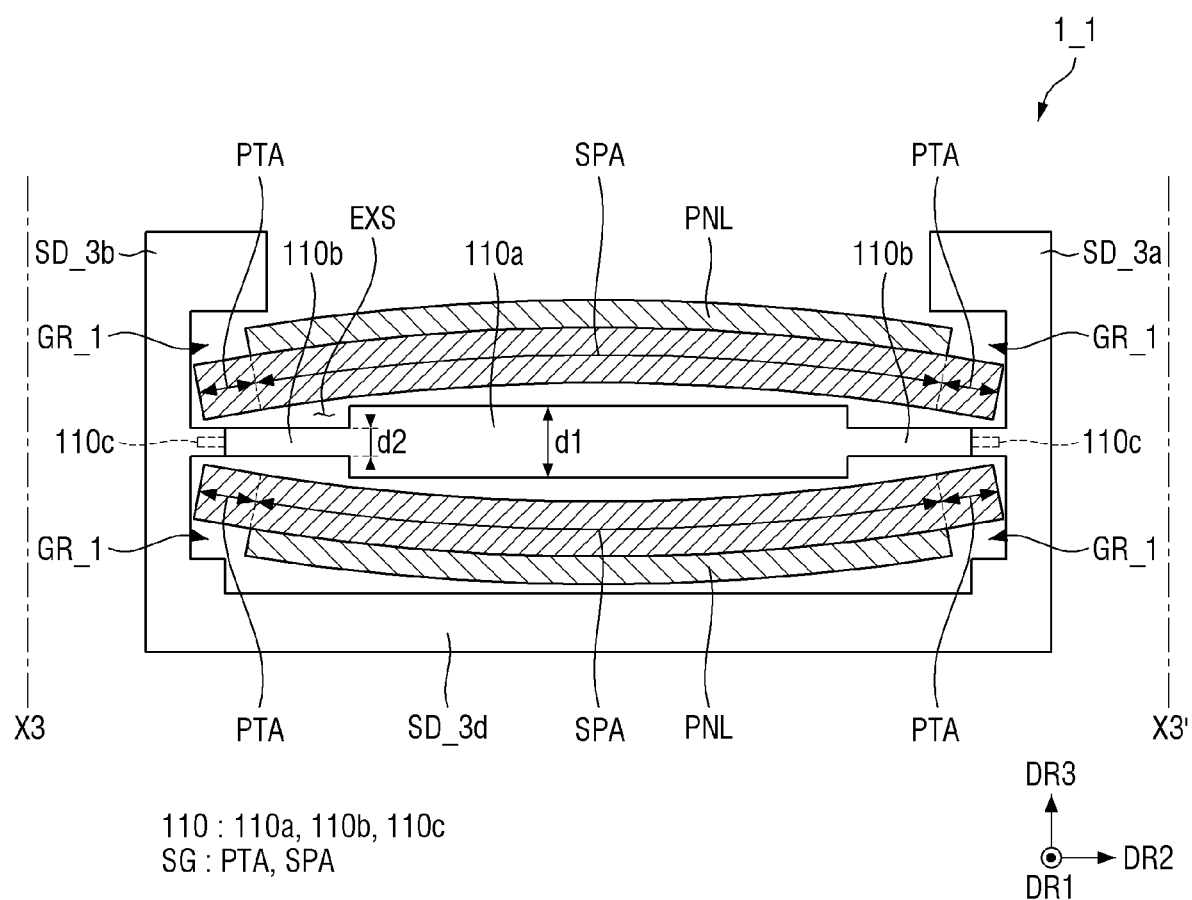
FIG. 13 is a schematic cross-sectional view of a deformation area of the display device according to the embodiment of FIG. 12.

FIG. 12 is a schematic cross-sectional view of a display device according to another embodiment of the disclosure. FIG. 13 is a schematic cross-sectional view of a deformation area of the display device according to the embodiment of FIG. 12.

In the embodiment shown in FIGS. 12 and 13, guide rails GR_1 of a display device 1_1 according to the embodiment may be engaged with a portion of the display panel PNL as well as protruding areas PTA of segments SG. The portion of the display panel PNL engaged with the guide rails GR_1 may be the non-active area NAA described above.

As a result, the width of the guide rails GR_1 in the third direction DR3 may increase, and thus a space in which the segments SG can be curved may be further increased in the deformation area DFA.

Figure 14:
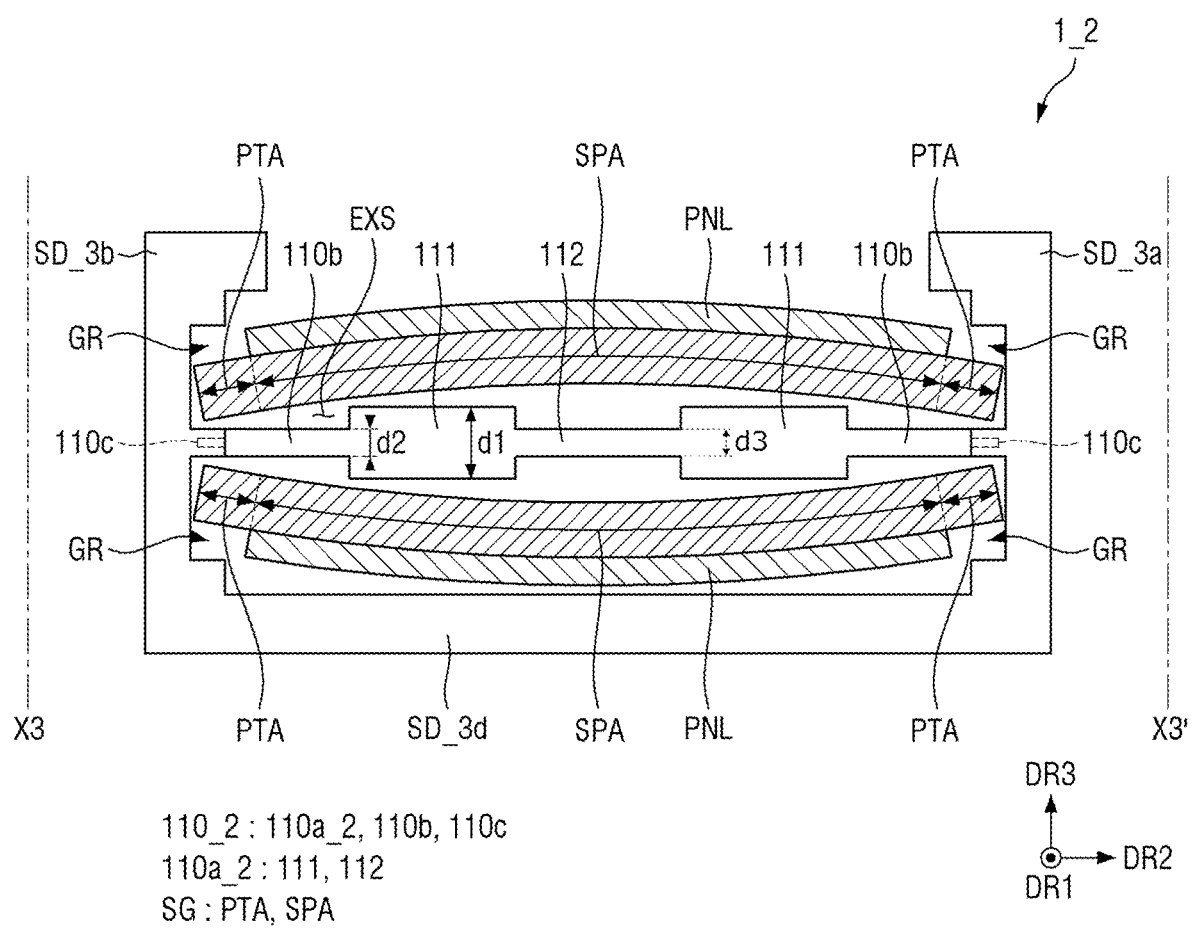
FIG. 14 is a schematic cross-sectional view of a deformation area of a display device according to yet another embodiment.

FIG. 14 is a schematic cross-sectional view of a deformation area of a display device according to yet another embodiment.

In the embodiment shown in FIG. 14, a roller 110_2 of a display device 1_2 according to the embodiment may have a step in a central portion 110a_2 as well. For example, the central portion 110a_2 may include first portions 111 that have a first diameter d1 and are spaced apart from each other in the second direction DR2, and a second portion 112 that is disposed between the first portions 111 and has a third diameter d3.

The third diameter d3 of the second portion 112 may be less than the first diameter d1 of the first portions 111. In an embodiment, the third diameter d3 may be substantially equal to the second diameter d2, but the disclosure is not limited thereto.

With the above configuration, the steps may be formed on the roller 110_2 of the display device 1_2 according to the embodiment, the weight of the roller 110_2 may be reduced as an area the segments SG and the roller 110_2 contacting each other is reduced. As a result, the display device may slide readily.

Figure 15:
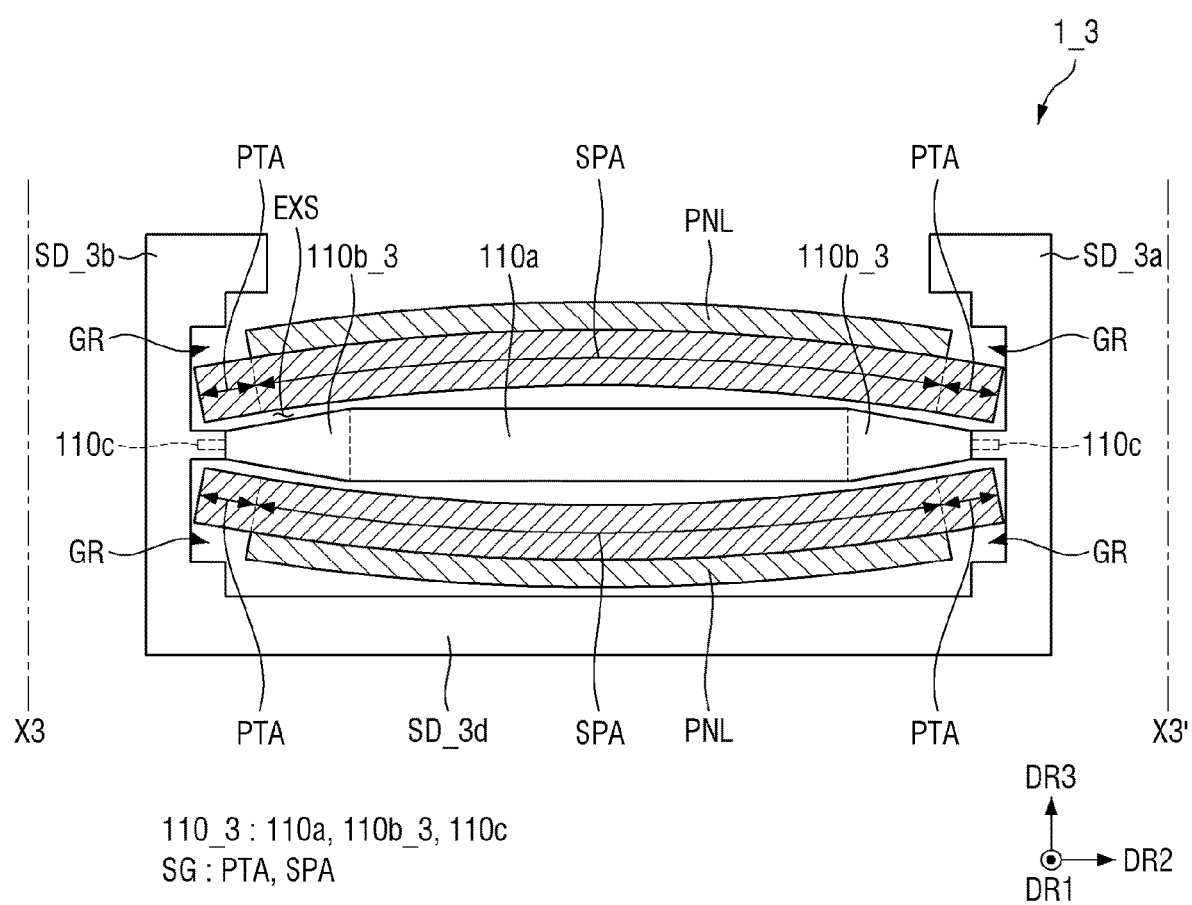
FIG. 15 is a schematic cross-sectional view of a deformation area of a display device according to yet another embodiment.

FIG. 15 is a schematic cross-sectional view of a deformation area of a display device according to yet another embodiment.

In the embodiment shown in FIG. 15, stepped portions 110b_3 of a roller 110_3 of a display device 1_3 according to the embodiment may have a diameter that decreases continuously. For example, the stepped portions 110b_3 may have a slope in which the diameter gradually increases toward the central portion 110a.

With the above configuration, the process of fabricating the roller 110_3 may be simplified.

Figure 16:
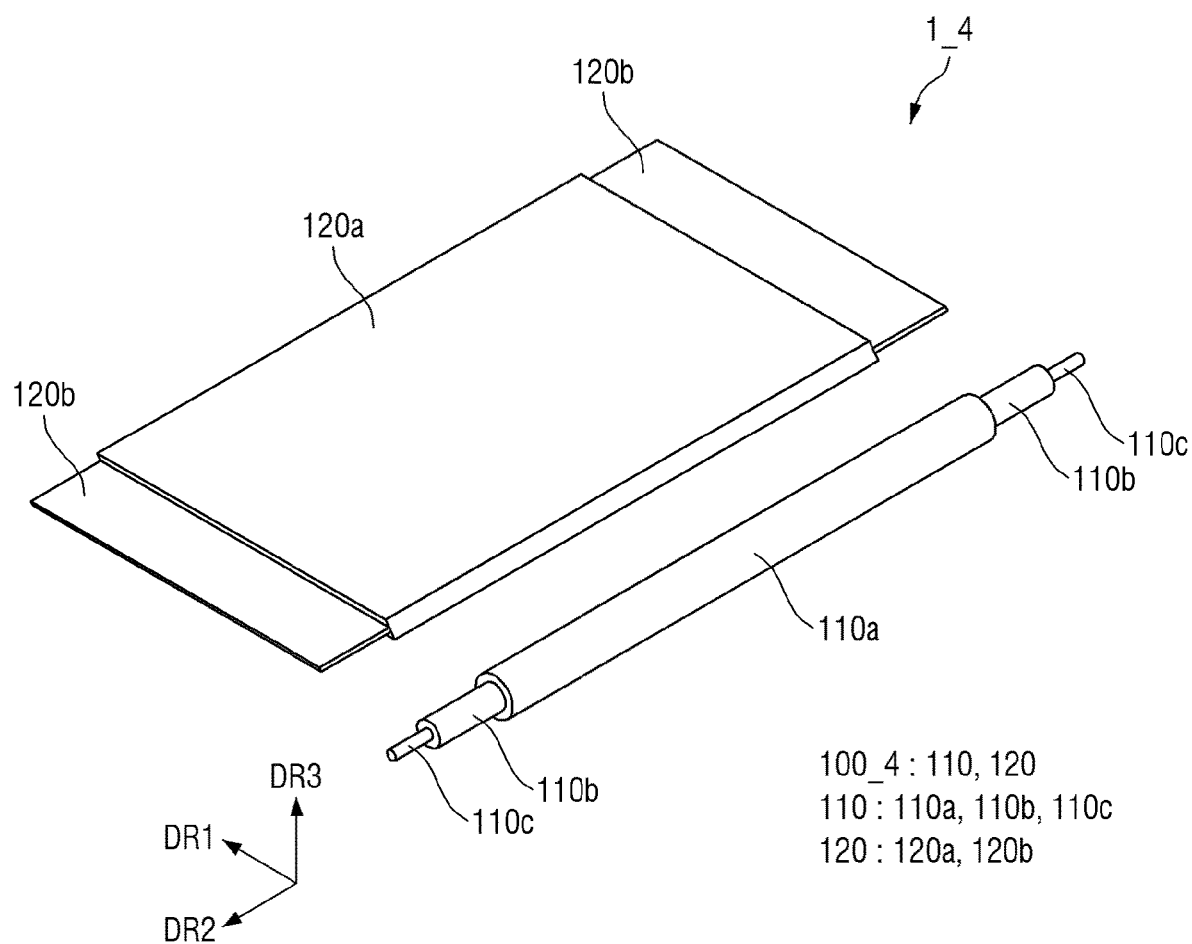
FIG. 16 is a perspective view schematically showing a slide assist member of a display device according to yet another embodiment.
Figure 17:
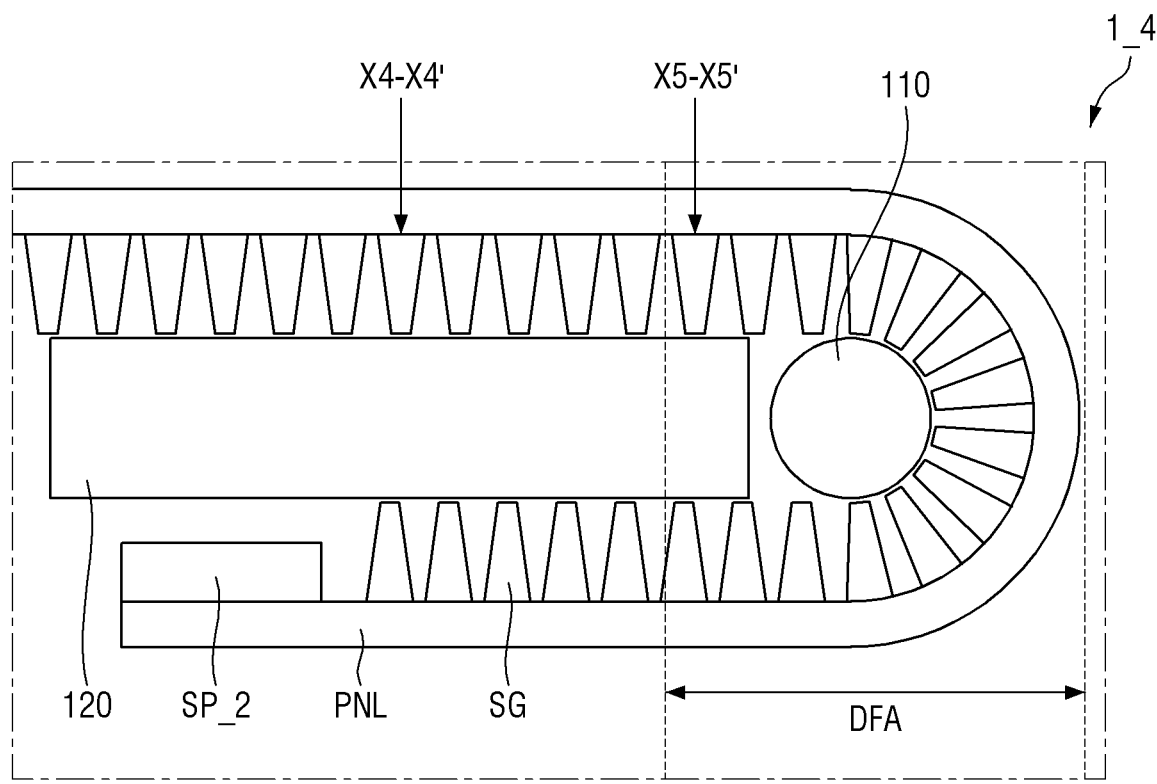
FIG. 17 is a side view showing an arrangement relationship between the slide assist member and a display module of the display device according to the embodiment of FIG. 16.
Figure 17:
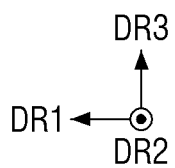
Figure 18:
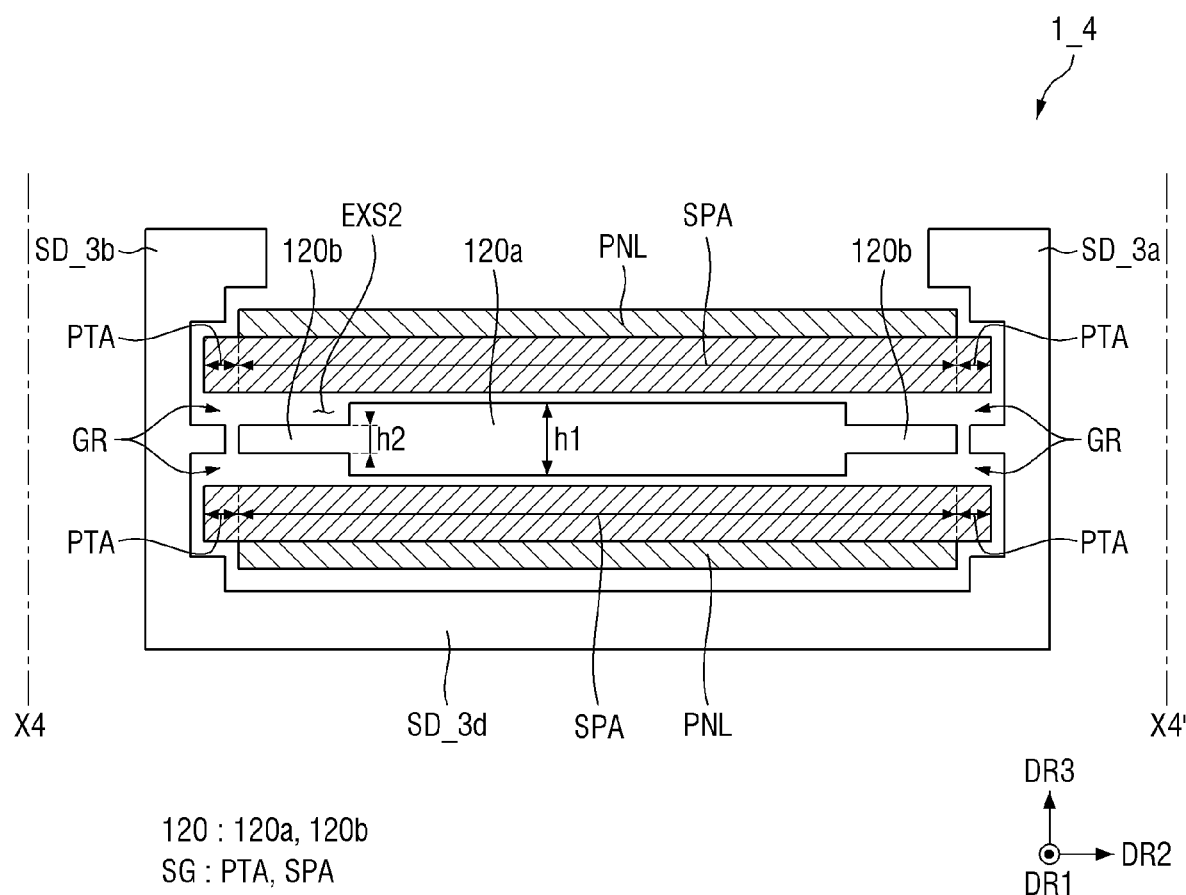
FIG. 18 is a schematic cross-sectional view taken along line X4-X4' of FIG. 17.
Figure 19:
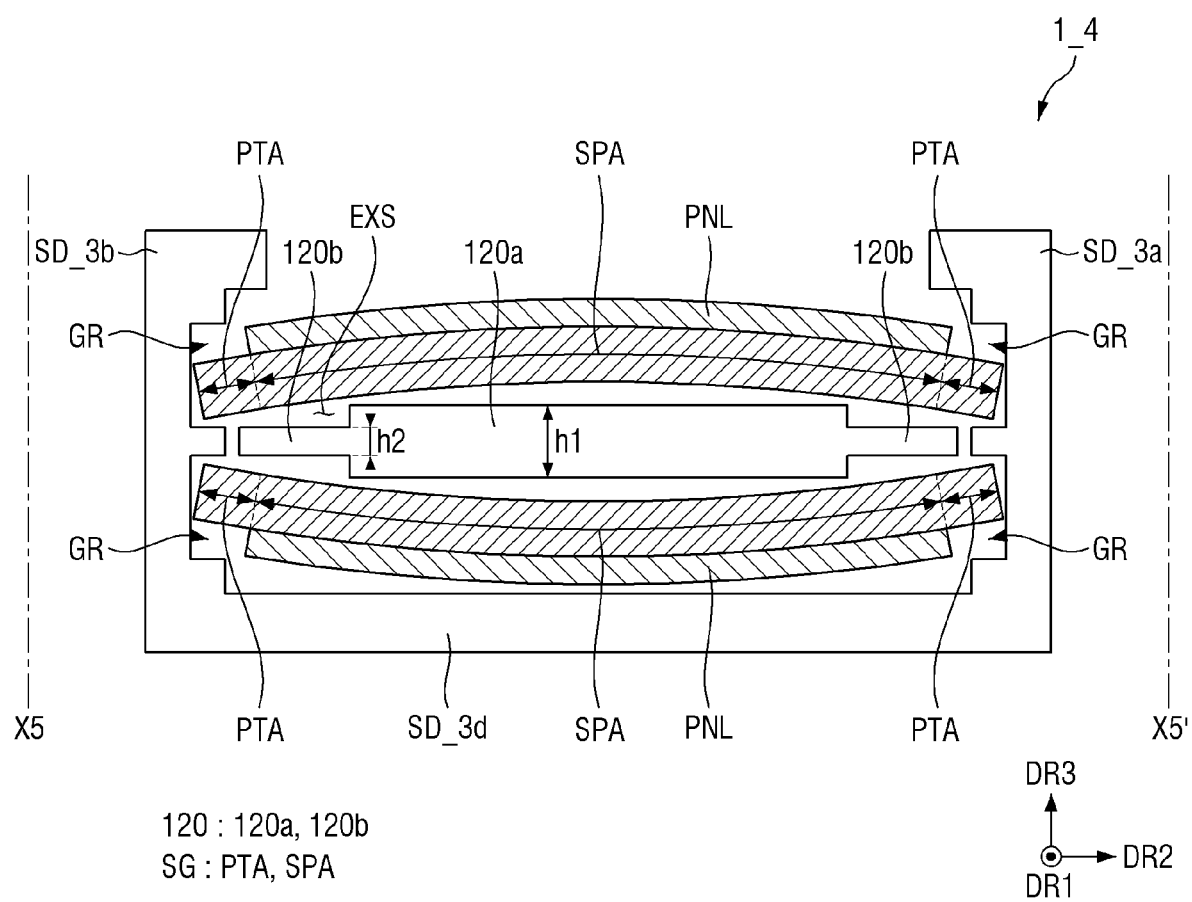
FIG. 19 is a schematic cross-sectional view taken along line X5-X5' of FIG. 17.

FIG. 16 is a perspective view schematically showing a slide assist member of a display device according to yet another embodiment. FIG. 17 is a side view showing an arrangement relationship between the slide assist member and a display module of the display device according to the embodiment of FIG. 16. FIG. 18 is a schematic cross-sectional view taken along line X4-X4' of FIG. 17. FIG. 19 is a schematic cross-sectional view taken along line X5-X5' of FIG. 17.

In the embodiment shown in FIG. 18, guide rails GR may be engaged with segments SG in areas other than a deformation area DFA of a display device 1_4 according to the embodiment. In the embodiment shown in FIG. 19, the guide rails GR may be engaged with the segments SG in the deformation area DFA of the display device 1_4 according to the embodiment.

In the embodiment shown in FIGS. 16 to 19, a slide assist member 100_4 of the display device 1_4 according to the embodiment may further include a flat auxiliary plate 120 as well as a roller 110.

The auxiliary plate 120 may have a generally rectangular parallelepiped shape in a plan view. As shown in FIG. 17, the auxiliary plate 120 may extend beyond the deformation area DFA to areas other than the deformation area DFA. Accordingly, the auxiliary plate 120 may support a portion of the display module DM that slides and is not curved. The auxiliary plate 120 may include a central portion 120a having a first thickness h1, and edge portions 120b having a second thickness h2.

The central portion 120a of the auxiliary plate 120 may comprise most of the auxiliary plate 120. The central portion 120a may overlap a support area SPA of the segments SG to support the display module DM. In an embodiment, the central portion 120a may be disposed in the central portion of the auxiliary plate 120, but the disclosure is not limited thereto.

Stepped portions 120b of the auxiliary plate 120 may protrude in the second direction DR2 from each side of the central portion 120a in the second direction DR2. The stepped portions 120b may have a flat plate shape having a second thickness h2 less than the first thickness h1 of the central portion 120a. Accordingly, as steps are formed in the auxiliary plate 120, an extra space EXS2 in which the segments SG engaged with the guide rails GR can be curved, may be provided, as will be described below. In an embodiment, the step difference between the first thickness h1 and the second thickness h2 may be, but is not limited to, greater than or equal to about 0.2 mm.

The stepped portions 120b may overlap at least a portion of the support area SPA and a portion of the protruding areas PTA of the segments SG in the third direction DR3.

With the above configuration, the slide assist member 100_4 of the display device 1_4 according to the embodiment may support the display module DM more stably.

Figure 20:
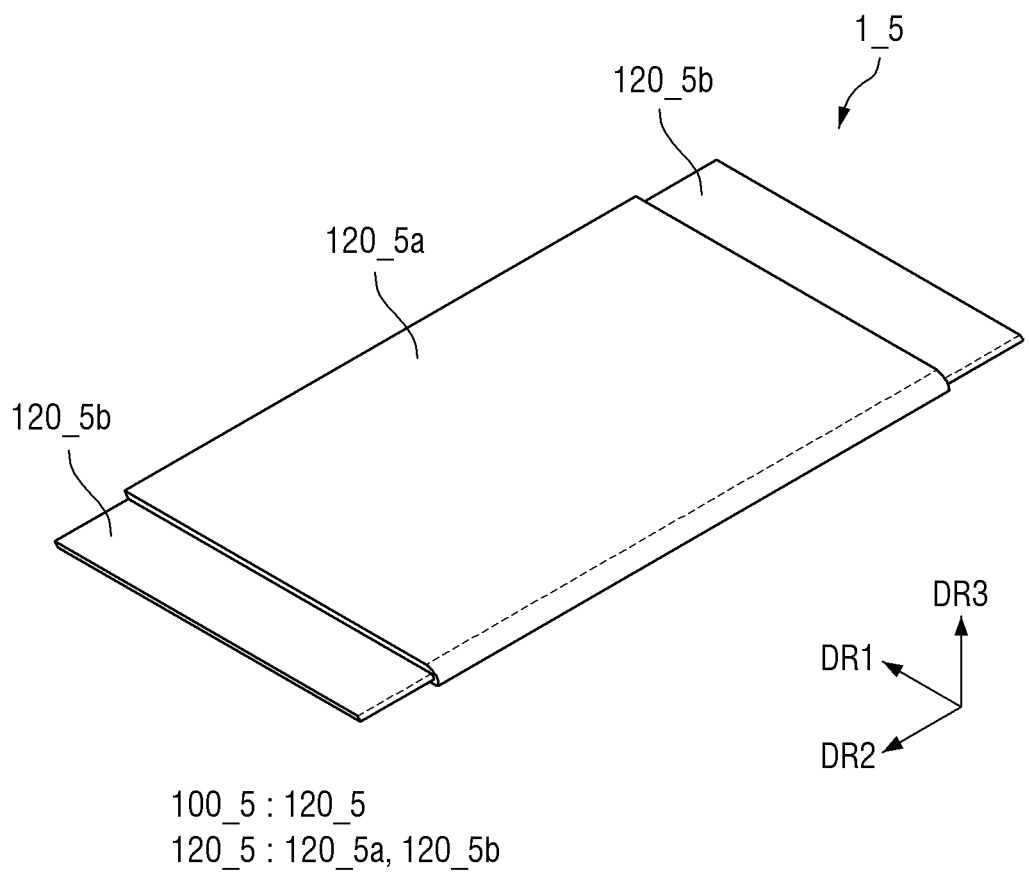
FIG. 20 is a perspective view schematically showing an auxiliary plate of a display device according to yet another embodiment.
Figure 21:
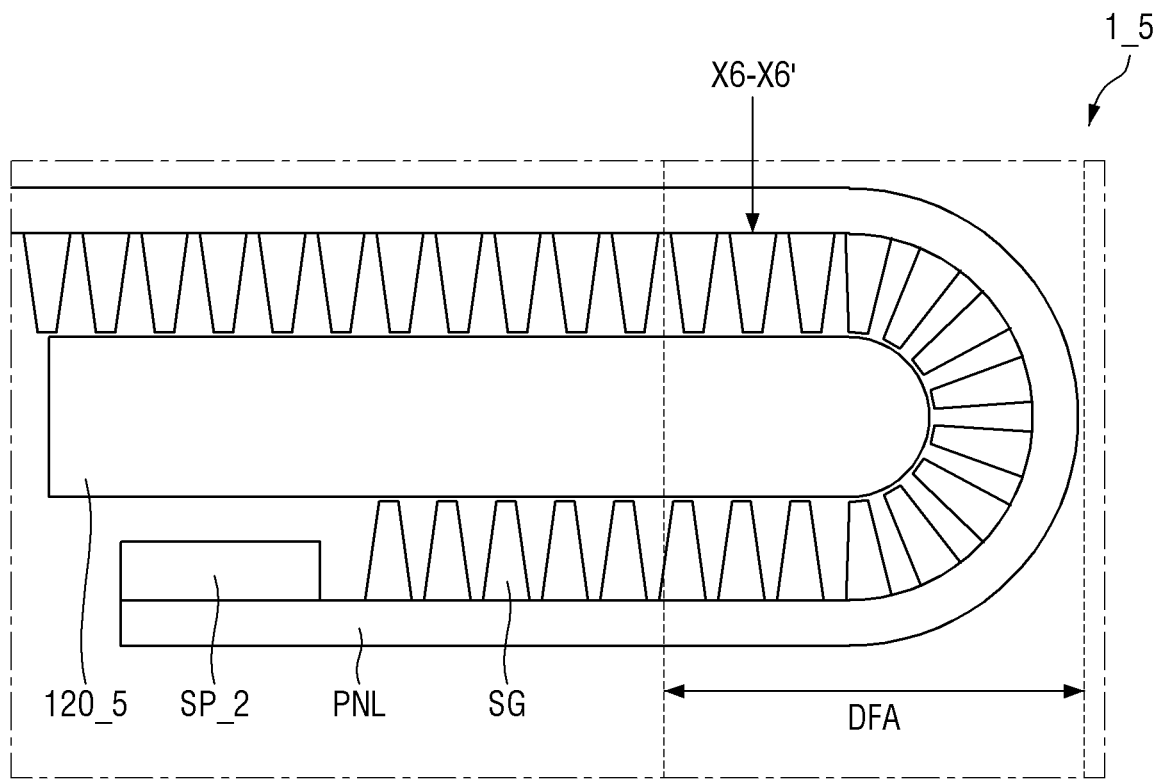
FIG. 21 is a side view showing an arrangement relationship between the auxiliary plate and a display module of the display device according to the embodiment of FIG. 20.
Figure 21:
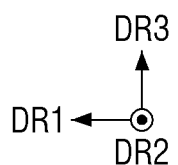
Figure 22:
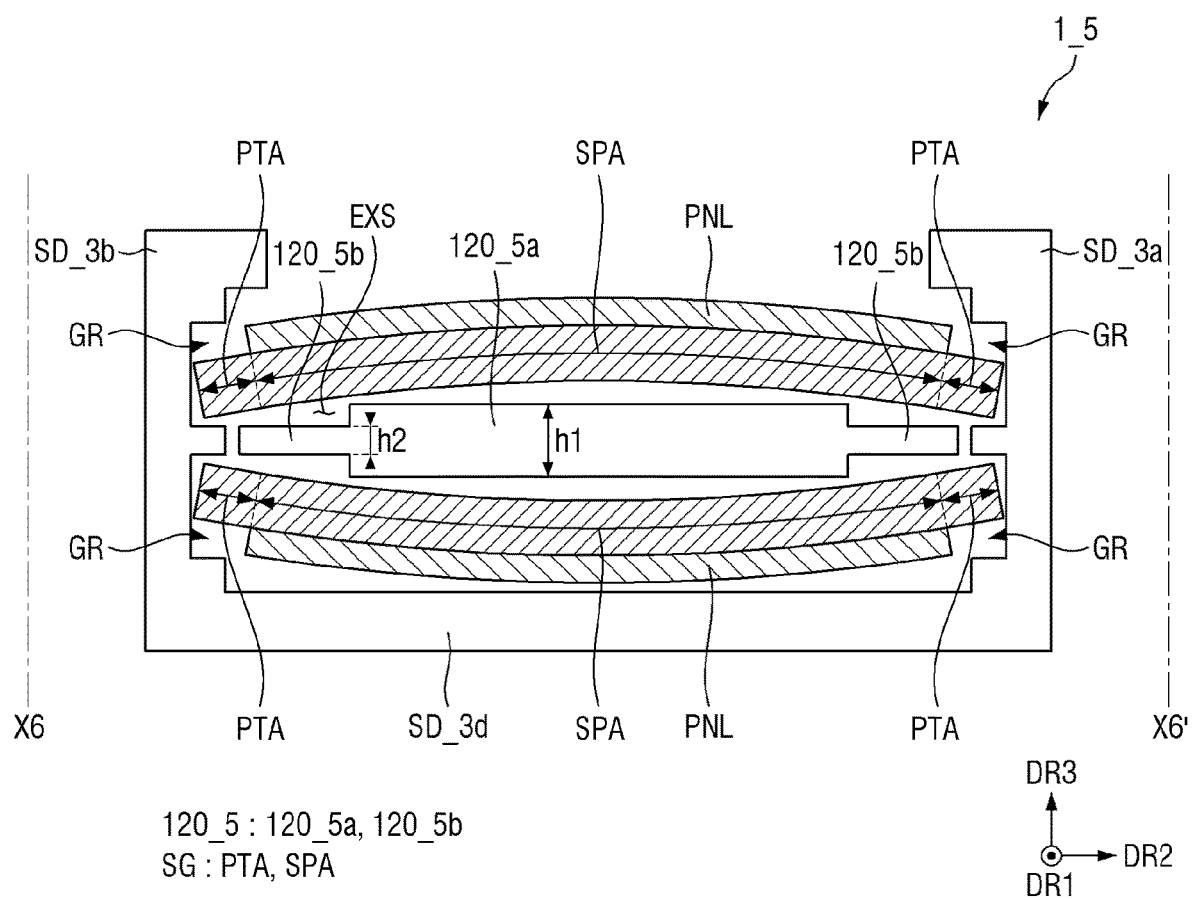
FIG. 22 is a schematic cross-sectional view taken along line X6-X6' of FIG. 21.

FIG. 20 is a perspective view schematically showing an auxiliary plate of a display device according to yet another embodiment. FIG. 21 is a side view showing an arrangement relationship between the auxiliary plate and a display module of the display device according to the embodiment of FIG. 20. FIG. 22 is a schematic cross-sectional view taken along line X6-X6' of FIG. 21.

In the embodiment shown in FIG. 21, guide rails GR may be engaged with segments SG in a deformation area DFA of a display device 1_5 according to the embodiment.

In the embodiment shown in FIGS. 20 to 22, a slide assist member 100_5 of the display device 1_5 according to the embodiment may include an auxiliary plate 120_5 having a curved side. The display device 1_5 according to the embodiment of FIG. 20 is substantially identical to the display device 1_4 according to the embodiment of FIG. 16 except that the roller 110 is not arranged, and the shape of the auxiliary plate 120_5 is different; and, therefore, the redundant descriptions will be omitted.

For example, the auxiliary plate 120_5 may have a shape in which a side in an opposite direction of the first direction DR1 is convexly curved toward an opposite direction of the first direction DR1. Accordingly, as shown in FIG. 21, the display module DM may be curved along a side of the auxiliary plate 120_5 in an opposite direction of the first direction DR1 and surround the side of the auxiliary plate 120_5 in an opposite direction of the first direction DR1. Therefore, the auxiliary plate 120_5 may support the curved portion of the display module DM in the rounded area of the display device 1_5 without a separate roller, so that the display device may slide smoothly.

The auxiliary plate 120_5 may include a central portion 120_5a having a first thickness h1, and edge portions 120_5b having a second thickness h2 in the third direction DR3. The central portion 120_5a and the edge portions 120_5b may be substantially identical to the central portion 120a and the edge portions 120b of FIG. 16 except that a side is cured; and, therefore, the redundant descriptions will be omitted.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
   a display panel comprising a first active area and a second active area disposed on a side of the first active area and slidable in a first direction;
   a plurality of segments spaced apart from one another in the first direction, extending in a second direction intersecting the first direction, and supporting a lower surface of the second active area of the display panel;
   a panel housing having a guide rail engaged with a portion of each of the plurality of segments to guide a sliding motion of the display panel; and
   a first roller extending in the second direction, disposed in the panel housing, and surrounded by the lower surface of the second active area of the display panel, wherein the first roller comprises:
      a central portion having a first diameter;
      a stepped portion protruding from the central portion in the second direction, forming a level difference with the central portion, and overlapping at least one of the plurality of segments to form a space in a thickness direction of the second active area; and
      a protrusion that protrudes from the stepped portion in the second direction and engages with a hole formed on the panel housing,
   the stepped portion has a second diameter less than the first diameter, and
   the protrusion has a third diameter less than the second diameter.

2. The display device of claim 1, wherein
   each of the plurality of segments comprises:
      a support area overlapping the second active area of the display panel in the thickness direction; and
      a protruding area that does not overlap the display panel in the thickness direction and engages with the guide rail,
   the central portion of the first roller overlaps the support area of the at least one of the plurality of segments in the thickness direction, and
   the stepped portion of the first roller overlaps the protruding area of the at least one of the plurality of segments in the thickness direction.

3. The display device of claim 1, wherein the protrusion of the first roller does not overlap the plurality of segments in the thickness direction.

4. The display device of claim 1, wherein
   a portion of the second active area is curved along the first roller to surround the first roller,
   the plurality of segments comprise a first segment disposed in the portion of the second active area, and
   the first segment is convexly curved in a radial direction of the first roller.

5. The display device of claim 4, wherein an end of the first segment that is convexly curved is disposed adjacent to the stepped portion of the first roller.

6. The display device of claim 1, wherein a diameter of the stepped portion gradually decreases from the central portion in an axial direction.

7. The display device of claim 1, wherein the central portion comprises:
   a first portion and a second portion, the first portion and the second portion having the first diameter and spaced apart from each other in the second direction; and
   a third portion having a second diameter less than the first diameter and disposed between the first portion and the second portion.

8. The display device of claim 1, wherein
   the display panel further comprises a third active area disposed on an opposite side of the first active area and slidable in the first direction,
   the plurality of segments support the lower surface of the second active area and a lower surface of the third active area, and
   the display device further comprises:
   a second roller extending in the second direction, disposed in the panel housing, and surrounded by the lower surface of the third active area of the display panel.

9. The display device of claim 8, wherein the second roller comprises:
   a central portion having the first diameter; and
   a stepped portion protruding from the central portion in the second direction, forming a level difference with the central portion, and overlapping at least another one of the plurality of segments to form a space in the thickness direction.

10. The display device of claim 9, wherein
   the display panel further comprises a subsidiary area protruding from the first active area in the second direction, and
   a driving chip for driving the display panel is mounted on the subsidiary area.

11. A display device comprising:
   a display panel comprising a first active area and a second active area disposed on a side of the first active area and slidable in a first direction;

a plurality of segments spaced apart from one another in the first direction, extending in a second direction intersecting the first direction, and supporting a lower surface of the second active area of the display panel;
a panel housing having a guide rail engaged with a portion of each of the plurality of segments to guide a sliding motion of the display panel;
an auxiliary plate disposed in the panel housing and surrounded by the lower surface of the second active area of the display panel; and
a roller extending in the second direction, disposed in the panel housing, and surrounded by the lower surface of the second active area of the display panel, wherein
the auxiliary plate comprises:
 a central portion having a first thickness in a thickness direction of the first active area, and
 an edge portion having a second thickness less than the first thickness in the thickness direction, and
the roller comprises:
 a central portion having a first diameter; and
 a stepped portion protruding from the central portion in the second direction, forming a level difference with the central portion, and overlapping at least one of the plurality of segments to form a space in a thickness direction of the second active area; and
 a protrusion that protrudes from the stepped portion in the second direction and engages with a hole formed on the panel housing,
the stepped portion has a second diameter less than the first diameter, and
the protrusion has a third diameter less than the second diameter.

12. The display device of claim 11, wherein
each of the plurality of segments comprises:
 a support area overlapping the second active area of the display panel in a thickness direction of the second active area; and
 a protruding area that does not overlap the display panel in the thickness direction of the first active area and engages with the guide rail,
the central portion of the auxiliary plate overlaps the support area of the each of the plurality of segments in the thickness direction of the first active area, and
the edge portion of the auxiliary plate overlaps the protruding area of the each of the plurality of segments in the thickness direction of the first active area.

13. The display device of claim 12, wherein
a portion of the second active area is curved along the auxiliary plate to surround the auxiliary plate,
the plurality of segments comprise a first segment disposed in the portion of the second active area, and
the first segment is convexly curved in a radial direction of the auxiliary plate.

14. The display device of claim 13, wherein
the edge portion of the auxiliary plate forms a level difference with the central portion to form an extra space, and
an end of the first segment that is convexly curved is disposed in the extra space.

15. The display device of claim 14, wherein
an end of the auxiliary plate is convexly curved, and
the portion of the second active area is curved along the end.

* * * * *